(12) United States Patent
Ishii et al.

(10) Patent No.: US 9,868,473 B2
(45) Date of Patent: Jan. 16, 2018

(54) LAYERED PANEL

(75) Inventors: Kenji Ishii, Aichi (JP); Kazuhiko Saeki, Aichi (JP)

(73) Assignee: KYORAKU CO., LTD., Kyoto (JP)

( * ) Notice: Subject to any disclaimer, the term of this patent is extended or adjusted under 35 U.S.C. 154(b) by 44 days.

(21) Appl. No.: 14/343,582

(22) PCT Filed: Sep. 13, 2012

(86) PCT No.: PCT/JP2012/073481
§ 371 (c)(1),
(2), (4) Date: Mar. 7, 2014

(87) PCT Pub. No.: WO2013/047224
PCT Pub. Date: Apr. 4, 2013

(65) Prior Publication Data
US 2014/0205809 A1    Jul. 24, 2014

(30) Foreign Application Priority Data

Sep. 26, 2011  (JP) ................................ 2011-209222
Sep. 26, 2011  (JP) ................................ 2011-209226

(51) Int. Cl.
*B62D 25/20*    (2006.01)
*B32B 3/30*    (2006.01)
(Continued)

(52) U.S. Cl.
CPC ............ *B62D 25/20* (2013.01); *B29C 53/063* (2013.01); *B32B 3/30* (2013.01); *B32B 5/022* (2013.01);
(Continued)

(58) Field of Classification Search
CPC ......... B29C 51/08; B29C 51/10; B29C 51/12; B29C 51/267; B29C 53/063; B29C 70/70;
(Continued)

(56) References Cited

U.S. PATENT DOCUMENTS 3,445,052 A * 5/1969 Lewallen .................. E05D 1/02
16/225
4,543,229 A * 9/1985 Nickerson ................. E04C 1/41
264/321
(Continued)

FOREIGN PATENT DOCUMENTS

JP        60-25551       2/1985
JP        61-165850      10/1986
(Continued)

OTHER PUBLICATIONS

Official Action, with English-language translation thereof, for JP Pat. App. No. 2011-209222 dated Oct. 27, 2015.

*Primary Examiner* — Aaron Austin
*Assistant Examiner* — Alicia J Sawdon
(74) *Attorney, Agent, or Firm* — Greenblum & Bernstein, P.L.C.

(57) ABSTRACT

A layered panel in which strength of a hinge can be improved regardless of the kinds of substrates configuring a front wall and a rear wall of the layered panel is provided. A layered panel in accordance with the present invention is a layered panel rotatable about a hinge as a rotary axis, characterized by including a front wall, a rear wall, and an intermediate layer interposed between the front wall and the rear wall, the hinge including the intermediate layer.

12 Claims, 24 Drawing Sheets

(51) Int. Cl.

| | |
|---|---|
| *B29C 53/06* | (2006.01) |
| *B32B 5/02* | (2006.01) |
| *B32B 27/12* | (2006.01) |
| *B32B 27/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *B29C 49/20* | (2006.01) |
| *B29C 51/10* | (2006.01) |
| *B29C 51/12* | (2006.01) |
| *B29C 70/70* | (2006.01) |
| *B29C 51/26* | (2006.01) |
| *B29L 31/22* | (2006.01) |
| *B29C 49/04* | (2006.01) |
| *B29C 51/08* | (2006.01) |
| *B29L 9/00* | (2006.01) |

(52) U.S. Cl.
CPC ............ *B32B 27/12* (2013.01); *B32B 27/20* (2013.01); *B32B 27/302* (2013.01); *B32B 27/32* (2013.01); *B32B 27/34* (2013.01); *B32B 27/36* (2013.01); *B29C 49/04* (2013.01); *B29C 49/20* (2013.01); *B29C 51/08* (2013.01); *B29C 51/10* (2013.01); *B29C 51/12* (2013.01); *B29C 51/267* (2013.01); *B29C 70/70* (2013.01); *B29C 2791/006* (2013.01); *B29K 2715/003* (2013.01); *B29L 2009/00* (2013.01); *B29L 2031/22* (2013.01); *B32B 2262/101* (2013.01); *B32B 2262/106* (2013.01); *B32B 2605/00* (2013.01); *Y10T 428/24521* (2015.01)

(58) Field of Classification Search
CPC ... B29C 49/04; B29C 49/20; B29C 2791/006; B29L 2009/00; B29L 2031/22; B32B 3/30; Y10T 428/24521; B62D 25/20; B29K 2715/003

USPC .......................................................... 428/161
See application file for complete search history.

(56) References Cited

U.S. PATENT DOCUMENTS

| | | | | |
|---|---|---|---|---|
| 4,658,472 | A * | 4/1987 | Grenier ................... | E05D 1/02 16/225 |
| 5,915,445 | A * | 6/1999 | Rauenbusch ............ | E06B 9/13 160/230 |
| 5,945,053 | A * | 8/1999 | Hettinga ............... | B29C 47/003 16/225 |
| 6,255,237 | B1 * | 7/2001 | Sakamoto ................ | B32B 5/26 428/318.6 |
| 2002/0011695 | A1 * | 1/2002 | Stancu et al. ................. | 264/516 |
| 2003/0203150 | A1 * | 10/2003 | Moran et al. .................... | 428/85 |
| 2008/0197617 | A1 * | 8/2008 | Kobayashi ................... | 281/21.1 |
| 2010/0104788 | A1 * | 4/2010 | Kitano .................... | B29C 51/12 428/36.4 |
| 2011/0135862 | A1 | 6/2011 | Sumi et al. | |
| 2013/0280472 | A1 * | 10/2013 | Preisler .................. | B32B 5/022 428/95 |

FOREIGN PATENT DOCUMENTS

| | | |
|---|---|---|
| JP | 6-226838 | 8/1994 |
| JP | 2000-190437 | 7/2000 |
| JP | 2003-503231 | 1/2003 |
| JP | 2008-247003 | 10/2008 |
| JP | 2009-34872 | 2/2009 |
| JP | 2009-241510 | 10/2009 |
| JP | 2010-174577 | 8/2010 |
| JP | 2011-88447 | 5/2011 |
| WO | WO 2008123158 A1 * | 10/2008 |
| WO | 2009-136489 | 11/2009 |

\* cited by examiner (a)

(b)

(c)

(a)

(b)

(c)

(a)

(b)

(c)

(a)

(b)

(a)

(b)

(c)

(d)

(e)

LAYERED PANEL

TECHNICAL FIELD

The present invention relates to a layered panel.

BACKGROUND ART

Heretofore, as a partition plate, a floor material, and the like of a trunk in a car or the like, there has been employed a layered panel rotatable about a hinge as a rotary axis.

For example, in patent document 1 (Japanese Patent Laid-Open Ser. No. 2009-241510), there is disclosed a layered panel in which rigidity of the layered panel is enhanced and durability of the hinge is improved.

In the layered panel of patent document 1, a first plate section is bent to be welded onto a second plate section side to form an integral hinge, and the integral hinge has an axial direction substantially parallel to an orientation direction of glass fiber disposed in the first plate section

PRIOR ART REFERENCE

Patent Document

PATENT DOCUMENT 1: Japanese Patent Laid-Open Ser. No. 2009-241510

SUMMARY OF THE INVENTION

Problems to be Solved by the Invention

However, the hinge of patent document 1 is formed by bending the first plate section and by welding it onto the second plate section side. Hence, strength of the hinge of patent document 1 is influenced by strength of the plate sections configuring the hinge.

Recently, various kinds of plate sections are employed according to use purposes; hence, depending on the kinds of the plate sections employed in the layered panel, it is not possible to enhance the strength of the hinge formed by the plate sections in some cases. The plate sections indicate substrates configuring the front wall and the rear wall of the layered panel.

The present invention has been made in consideration of the situation above and aims at providing a layered panel in which the strength of the hinge can be improved regardless of the kinds of substrates configuring the front wall and the rear wall of the layered panel.

Means for Solving to the Problems

To achieve the object, the present invention has the following aspect.

The layered panel in accordance with the present invention is a layered panel rotatable about a hinge as a rotary axis, characterized by including a front wall, a rear wall, and an intermediate layer interposed between the front wall and the rear wall, the hinge comprising the intermediate layer.

ADVANTAGEOUS EFFECTS OF THE INVENTION

In accordance with the present invention, the strength of the hinge can be improved regardless of the kinds of substrates configuring the front wall and the rear wall of the layered panel.

DESCRIPTION OF THE EMBODIMENTS (Outline of Embodying Mode of Layered Panel 1 in Accordance with Present Invention)

Figure 3:
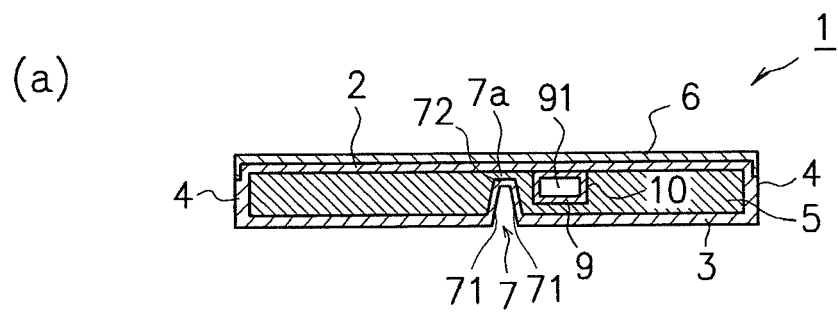
FIG. 3 shows cross-sectional diagrams of the layered panel 1 and the core member 5 in the present embodying mode, and (a) is a cross-sectional diagram of the layered panel 1 taken along line 3A-3A shown in FIG. 2(a), (b) is a cross-sectional diagram of the layered panel 1 taken along line 3B-3B shown in FIG. 2(a), and (c) is a cross-sectional diagram of the core member 5 taken along line 3B-3B shown in FIG. 2(a)
Figure 3:
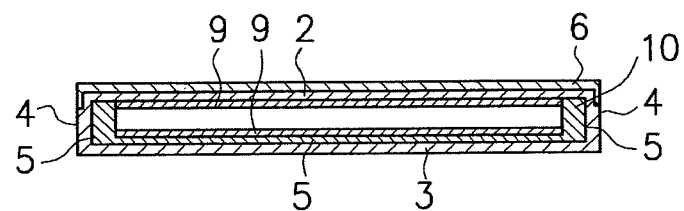
Figure 3:
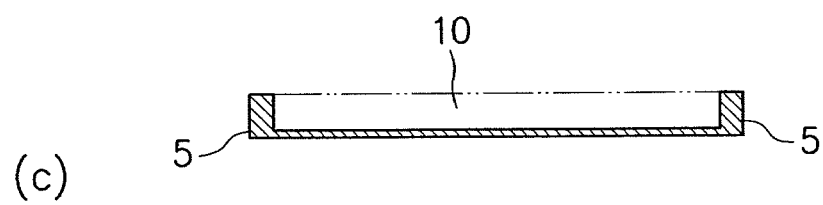

First, referring to FIGS. 3 and 8, description will be given of an outline of an embodying mode of the layered panel 1 in accordance with the present invention. FIG. 3 shows cross-sectional diagrams of the layered panel 1 in accordance with the present invention and FIG. 8 is a diagram showing a molding method example of the layered panel 1.

The layered panel 1 in accordance with the present invention is, as FIG. 3(a) shows, a layered panel 1 which can rotate about the hinge 7 as a rotary axis.

The layered panel 1 in accordance with the present invention is characterized by including a front wall 2, a rear wall 3, and an intermediate layer 5 existing between the front wall 2 and the rear wall 3, the hinge 7 including the intermediate layer 5.

Figure 8:
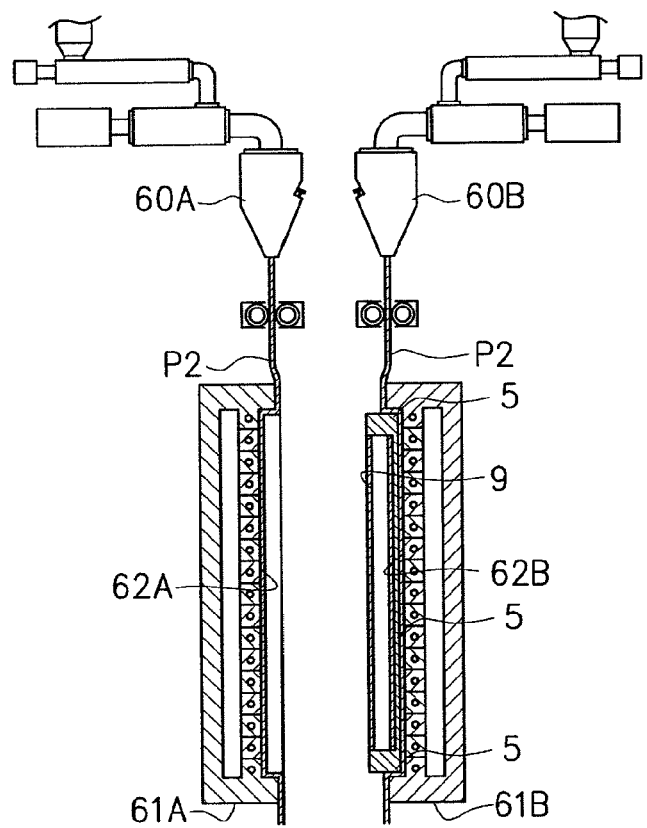
FIG. 8 is a diagram showing a molding method example of the layered panel 1.

For the layered panel 1 in accordance with the present invention, as FIG. 8 shows, resin P2 in a melted state to configure the front wall 2 and the rear wall 3 of the layered panel 1 and the intermediate layer 5 existing between the front wall 2 and the rear wall 3 are clamped by split molds 61, to mold the layered panel 1 including the hinge 7 including the intermediate layer 5 (reference is to be made to FIG. 3(a)). In FIG. 3(a), the part configured by the intermediate layer 5 in the hinge section 7 is indicated as hinge section 7a.

For example, as FIG. 8 shows, in a situation wherein a resinous core member 5 is used as the intermediate layer 5, when the core member 5 in which the hinge section 7a is formed by compressing a part of the core member 5 (reference is to be made to FIG. 3(a)) and the resin P2 in a melted state to configure the front wall 2 and the rear wall 3 are clamped by the split molds 61 and then the core member 5 and the resin P2 are welded onto each other, it is possible to mold the layered panel 1 including the hinge 7 including the intermediate layer 5. Incidentally, the intermediate layer 5 is not limited to be configured by the core member 5; it may be configured by a material such as non-woven fabric 11.

Since the hinge 7 of the layered panel 1 in accordance with the present invention includes the intermediate layer 5, the strength of the hinge can be improved regardless of the kinds of substrates configuring the front wall 2 and the rear wall 3 of the layered panel 1. Next, referring to the accompanying drawings, description will be given in detail of embodying modes of the layered panel 1 in accordance with the present invention.

(First Embodying Mode)

<Configuration Example of Layered Panel 1>

First, referring to FIGS. 1 to 3, description will be given of a configuration example of the layered panel 1 of the present embodying mode. The layered panel 1 of the present embodying mode is used as a partition plate, a floor material, and the like of a trunk in a car or the like.

Figure 1:
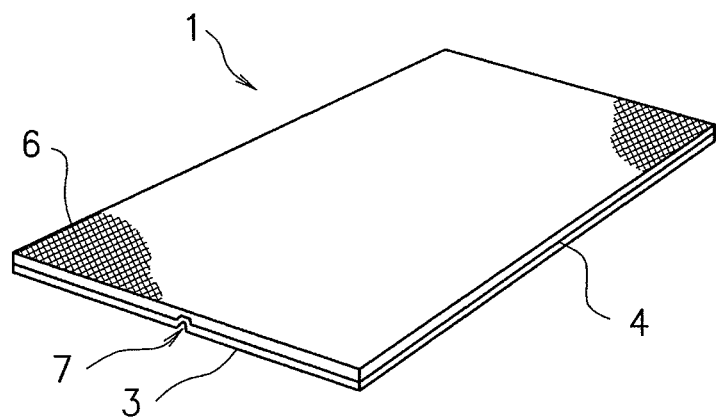
FIG. 1 is an overall perspective view of a layered panel 1 in the present embodying mode.
Figure 2:
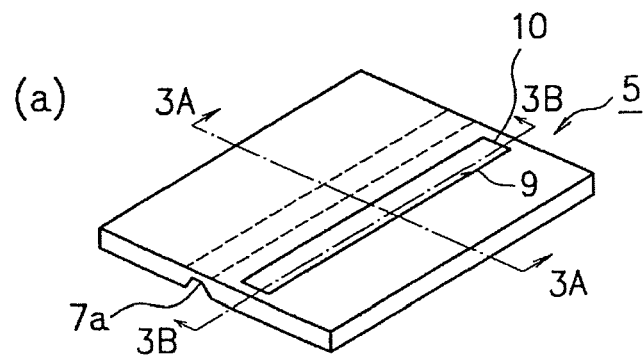
FIG. 2 is a diagram of a core member 5 configuring the layered panel 1 in the present embodying mode, and (a) is an overall perspective view, (b) is a top view, and (c) is a rear view.
Figure 2:
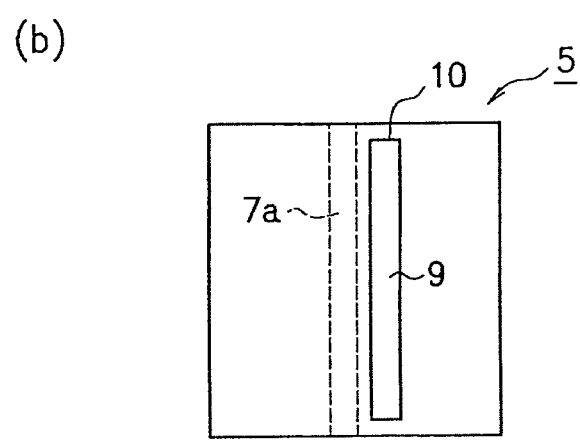
Figure 2:
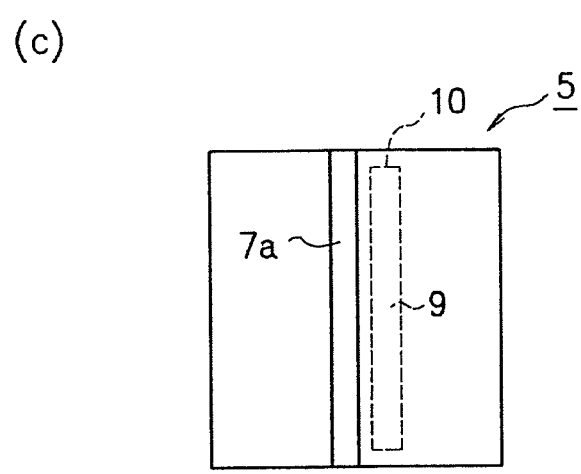

FIG. 1 is an overall perspective view of the layered panel 1, FIG. 2 is a diagram of the core member 5 configuring the layered panel 1, FIG. 2(a) is an overall perspective view, FIG. 2(b) is a top view, and FIG. 2(c) is a rear view. FIG. 3 shows cross-sectional diagrams of the layered panel 1 and the core member 5 in the present embodying mode, and FIG. 3(a) is a cross-sectional diagram of the layered panel 1 taken along line 3A-3A shown in FIG. 2(a), FIG. 3(b) is a cross-sectional diagram of the layered panel 1 taken along line 3B-3B shown in FIG. 2(a), and FIG. 3(c) is a cross-sectional diagram of the core member 5 taken along line 3B-3B shown in FIG. 2(a)

The layered panel 1 of the present embodying mode includes in the configuration, as shown in FIGS. 1 to 3, a front wall 2, a rear wall 3, a circumferential wall 4, and a core member 5. The circumferential wall 4 is, as shown in FIGS. 1 and 3, a section to couple the front wall 2 and the rear wall 3 with each other. In the layered panel 1 of the present embodying mode, as FIG. 1 shows, an ornamental member 6 for decoration or the like is adhered onto the surface of the front wall 2, and as FIG. 3 shows, the rear wall 3, the core member 5, the front wall 2, and the ornamental member 6 configure layered structure.

Also, the layered panel 1 of the present embodying mode includes the hinge 7 configured by depressing through compressing and thinning in the direction from the rear wall 3 to the front wall 2, and the layered panel 1 can rotate about the hinge 7 as a rotary axis. The hinge 7 is configured as shown in FIG. 3 in the shape of a depression depressed in the direction from the rear wall 3 to the front wall 2 side. The hinge 7 is configured by including a standing wall 71 which is a part of the rear wall 3 and which stands upward in the direction from the rear wall 3 to the front wall 2 and a compressed section 72 formed by compressing and thinning down layers (the rear wall 3, the core member 5, the front wall 2, and the ornamental member 6) configuring the layered panel 1. Both ends of the compressed section 72 of the rear wall 3 are coupled with one end of each standing wall 71 such that two standing walls 71 can rotate about the compressed section 72 as a rotary axis.

The resin to configure the front wall 2 and the rear wall 3 is not particularly limited; any known resin is applicable. For example, engineering plastics such as polyethylene resin, polypropylene resin, ethylene-vinyl acetate copolymer, vinyl chloride resin, ABS resin (acrylonitrile-styrene-butadiene resin), polyamide resin, polystyrene resin, poly ester resin, polycarbonate resin, and modified polyphenylene ether are favorable; according to necessity, it is also possible to add filler such as glass fiber, carbon fiber, calcium carbonate, talc, mica, and the like. However, as the resin to configure the front wall 2 and the rear wall 3, it is favorable, from a viewpoint of securing of rigidity, particularly, flectual rigidity of the layered panel 1 as a whole, to use resin higher in rigidity than the core member 5. Further, for the front wall 2 and the rear wall 3, it is favorable, from a point of view to prevent occurrence of variation in thickness due to drawdown and neck-in, to use resinous material having high melt tension; on the other hand, to enhance transcribing performance and tracing performance on the molds, it is favorable to use resin having high fluidity.

The core member 5 may be formed using known material, and may be configured using, for example, known resin similar to the resin configuring the front wall 2 and the rear wall 3. By configuring the core member 5 using resin, the shape of the core member 5 can be molded in a desired shape. Incidentally, it is favorable to configure the core member 5 by use of foaming material as in the present embodying mode. As a result, the layered panel 1 can be reduced in weight. When the core member 5 is configured by use of foaming material, it is favorably configured using independent bubble structure (independent bubble ratio is 70% or more) including a plurality of bubble cells with an expansion ratio ranging from 2.5 to 5.0. Incidentally, as the foaming agents applicable to mold the foaming material, physical foaming agents, chemical foaming agents, and mixtures thereof are considerable. As physical foaming agents, it is possible to employ inorganic physical foaming agents such as air, carbon dioxide, nitrogen dioxide, and water and organic physical foaming agents such as butane, pentane, hexane, dichloromethane, and dichloroethane; further, supercritical fluids thereof are applicable. Supercritical fluid is favorably produced by using carbon dioxide, nitrogen, and the like; for nitrogen, it may be produced at a critical temperature of $-149.1°$ C. under a critical pressure of 3.4 MPa or more; for carbon dioxide, it may be produced at a critical temperature of $31°$ C. under a critical pressure of 7.4 MPa or more.

The material to configure the ornamental member 6 is neither particularly limited; any known material is applicable. For example, it may be appropriately selected from knitted items, textiles, and nonwoven fabrics produced using natural fiber, reprocessed fiber, semi-synthetic fiber, synthetic fiber, and fiber obtained by blending these fibers; or, from resinous sheets including thermoplastic resins such as polyvinyl chloride (PVC), thermoplastic elastomer (TPE) including thermoplastic polyurethane elastomer (TPU) and thermoplastic polyurethane elastomer (TPO), and thermoplastic resin such as polyolefin-based resin and layered sheets thereof.

In the core member 5 of the present embodying mode, as FIG. 2 shows, a housing section 10 is formed at substantially a central position of the core member 5, and a reinforce member 9 is placed in the housing section 10. The material configuring the reinforce member 9 is not particularly limited; any known material is applicable. For example, a metallic item or a hard plastic item is applicable. Also, the cross-sectional contour of the reinforce member 9 is not particularly limited; the cross-sectional contour may be a circular shape including a circle and an ellipse, a polygonal shape including a triangle and a rectangle, and other shapes including an H shape and a C shape in the configuration. In the present embodying mode, as FIG. 3(a) shows as an example, there is employed a reinforce member 9 including an opening section 91. The housing section 10 is an area to house the reinforce member 9 therein. The housing section 10 of the present embodying mode is configured, as FIG. 3 shows, through depressing in a direction from the surface on the front wall 2 side of the core member 5 to that of the rear wall 3 side, and the reinforce member 9 is fitted into the housing section 10 to thereby fix the reinforce member 9. The contour of the housing section 10 is neither particularly limited; any contour may be used in the configuration only if it is possible to house the reinforce member 9 therein.

As for the core member 5 of the present embodying mode, as FIG. 2 shows, the core member 5 exists at end sections in the longitudinal direction of the housing section 10 such that the core member 5 is interposed between both ends of the reinforce member 9 and the circumferential wall 4. Hence, due to the core member 5 interposed between both ends of the reinforce member 9 and the circumferential wall 4, it is possible to prevent deformation due to the contraction difference between the layered panel 1 and the reinforce member 9.

In the present embodying mode, the housing section 10 is configured, as FIG. 3 shows, through depressing in a direction from the surface of the front wall 2 side of the core member 5 to that of the rear wall 3 side; however, the housing section 10 may also be configured using a through hole which passes through in a direction from the surface of the front wall 2 side of the core member 5 to that of the rear wall 3 side.

Moreover, in the core member 5 of the present embodying mode, as shown in FIGS. 2 and 3(a), the hinge section 7a is formed at substantially a central position of the core member 5, to thereby configure the hinge 7 of the layered panel 1. Hence, the hinge 7 is configured by including the core member 5. The hinge section 7a is configured through depressing in a direction from the surface of the rear wall 3 side of the core member 5 to that of the front wall 2 side.

The layered panel 1 of the present embodying mode is rotatable about the hinge 7 as the rotary axis, the hinge 7 being configured by including the hinge section 7a formed using the core member 5. The hinge section 7a may be formed by compressing and thinning down the core member 5. When the hinge section 7a is formed by compressing and thinning down the core member 5, it is possible to enhance strength of the hinge section 7a.

When the core member 5 of the present embodying mode is configured by use of foaming material having an expansion ratio ranging from 2.5 to 5.0, the expansion ratio of the hinge section 7a configured by compressing and thinning down the core member 5 is favorably set to 2.0 or less. As a result, it is possible to enhance strength of the hinge section 7a.

The hinge section 7a shown in FIG. 2 is formed in a linear contour and is continuously disposed in the core member 5. The hinge section 7a is formed on the rear surface side of the core member 5; hence, in the drawings shown in (a) and (b) of FIG. 2 (a perspective view and a top view), the position at which the hinge section 7a is formed is indicated by dotted lines. Further, in the drawing shown in FIG. 2(c) (a rear view), it is indicated by solid lines.

Parameters used at filing of the basic application are changed in consideration of the contents of supplementation.

Figure 9:
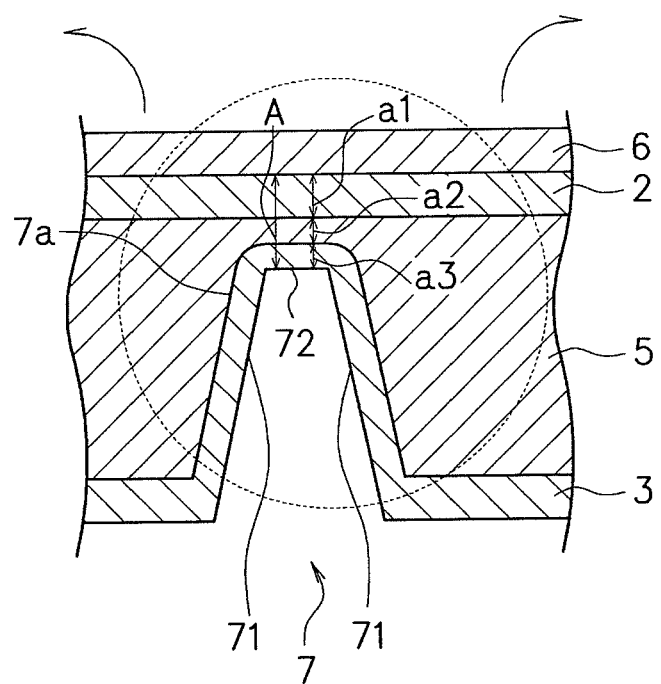
FIG. 9 is a first diagram showing a configuration example of a hinge 7.

The hinge 7 of the layered panel 1 of the present embodying mode is configured, as FIG. 9 shows, by interposing the hinge section 7a formed using the core member 5 between the rear wall 3 and the front wall 2, to enhance strength of the hinge 7 of the layered panel 1. Thickness A of the hinge 7 in the case of the configuration shown in FIG. 9 is favorably configured in a range of 0.5 mm to 0.9 mm. In this situation, it is favorable that thickness a1 of the front wall 2 configuring the hinge 7 is in a range of 0.2 mm to 0.3 mm, thickness a2 of the core member 5 is in a range of 0.1 mm to 0.3 mm, and thickness a3 of the rear wall 3 is in a range of 0.2 mm to 0.3 mm. As a result, it is possible to obtain the hinge 7 having strength endurable for the bending and the like of the layered panel 1.

Figure 4:
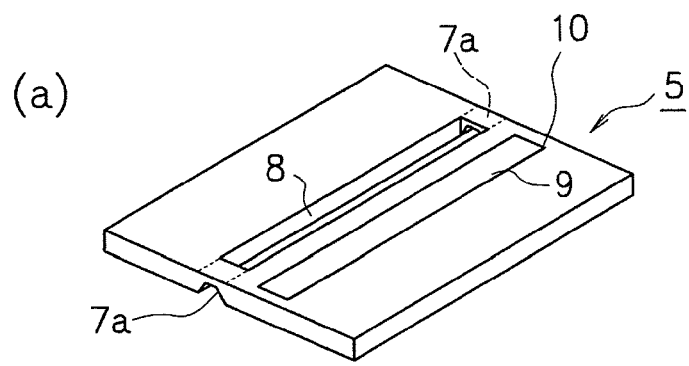
FIG. 4 is a diagram showing another configuration example of a hinge section 7a shown in FIG. 2.
Figure 4:
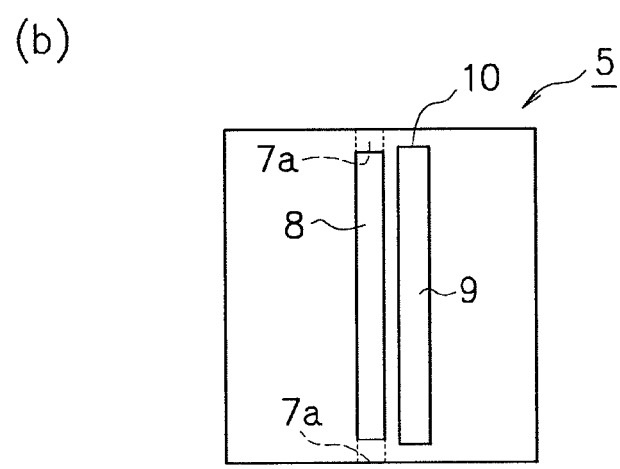
Figure 4:
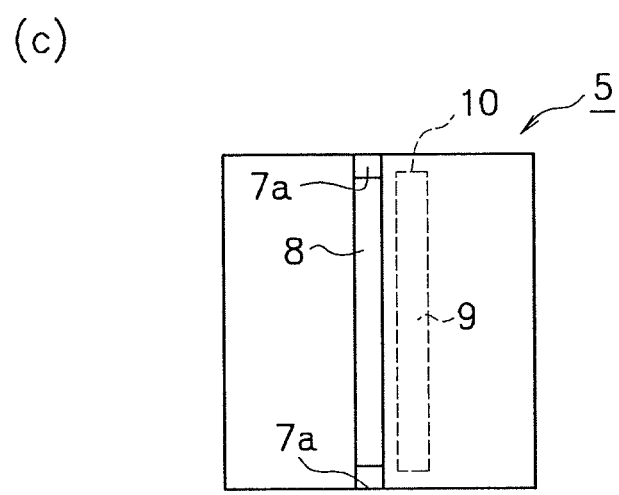

Incidentally, the contour of the hinge section 7a formed using the core member 5 is not limited to that shown in FIG. 2; it is possible to form the hinge section 7a in any contour only if the layered panel 1 is rotatable about the hinge section 7a as the rotary axis in the structure. For example, it is also possible as shown in FIG. 4 that the hinge section 7a is disposed at both ends of the core member 5 and the opening section 8 is formed therebetween, to thereby partly dispose the hinge section 7a. The opening section 8 may be formed by boring a hole through the core member 5.

Since the hinge section 7a of the present embodying mode is interposed between the rear wall 3 and the front wall 2, it is possible to enhance strength of the hinge 7 configured by including the hinge section 7a. However, the hinge section 7a is interposed between the rear wall 3 and the front wall 2; hence, depending on thickness of each of the rear wall 3, the hinge section 7a, and the front wall 2, the thickness in the layer direction of the hinge 7 (A indicated in FIG. 9) increases and the rotary movement of the layered panel 1 becomes difficult, and the function of the hinge 7 cannot be efficiently fulfilled in some cases.

Hence, it is favorable as shown in FIG. 2 that the hinge section 7a is not continuously disposed in the core member 5, and as shown in FIG. 4, the hinge section 7a is partly disposed such that even when thickness A in the layer direction of the hinge 7 increases, the function of the hinge 7 can be efficiently fulfilled. Incidentally, in FIG. 4, the hinge section 7a is disposed at both ends of the core member 5 and the opening section 8 is formed therebetween. However, it is also possible that a plurality of opening sections 8 are formed and the hinge section 7a is also formed in a part of the opening section 8 shown in FIG. 4, to thereby partly dispose a plurality of hinge sections 7a. Further, in FIG. 4, the opening section 8 is formed in the central section of the core member 5 and the hinge section 7a is disposed at both ends of the core member 5. However, it is also possible that the opening section 8 is formed at both ends of the core member 5 and the hinge section 7a is disposed in the central section of the core member 5.

In the layered panel 1 of the present embodying mode, the housing section 10 is disposed in the vicinity of the hinge section 7a and the reinforce member 9 is placed in the housing section 10. Hence, the strength of areas near the hinge 7 can be enhanced by the reinforce member 9.

<Layered Panel 1 Manufacturing Method Example>

Figure 5:
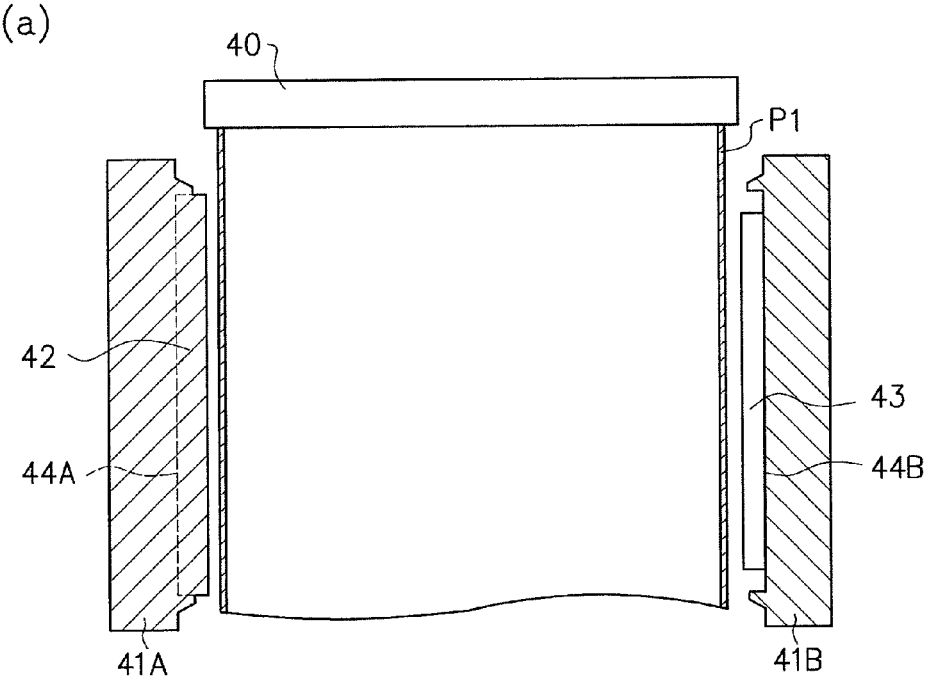
FIG. 5 is a first diagram showing a molding method example of the core member 5, and (a) shows a side-surface configuration example of split molds 41 to mold the core member 5 (5A-5A cross-sectional diagram shown in FIG. 5(b)) and (b) is a diagram showing a configuration example in which the split molds 41 shown in (a) are viewed from the upper surface (the extruding head 40 side).
Figure 5:
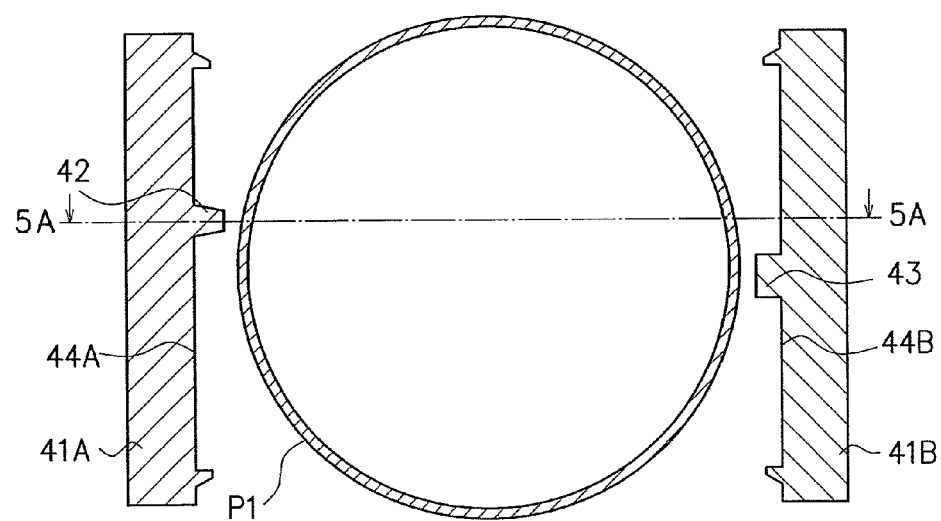
Figure 6:
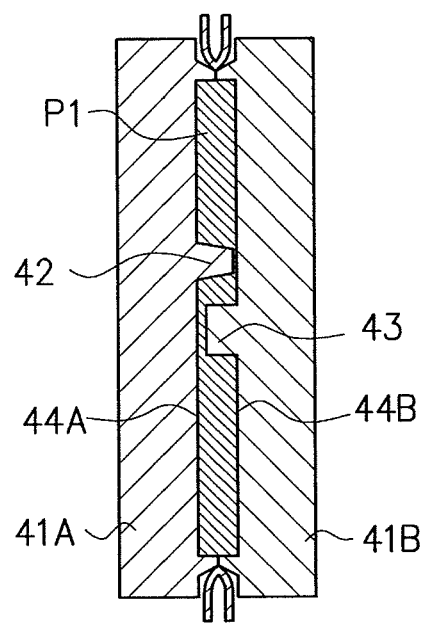
FIG. 6 is a second diagram showing a molding method example of the core member 5 and is a diagram showing a state in which the split molds 41 shown in FIG. 5(b) are closed.
Figure 7:
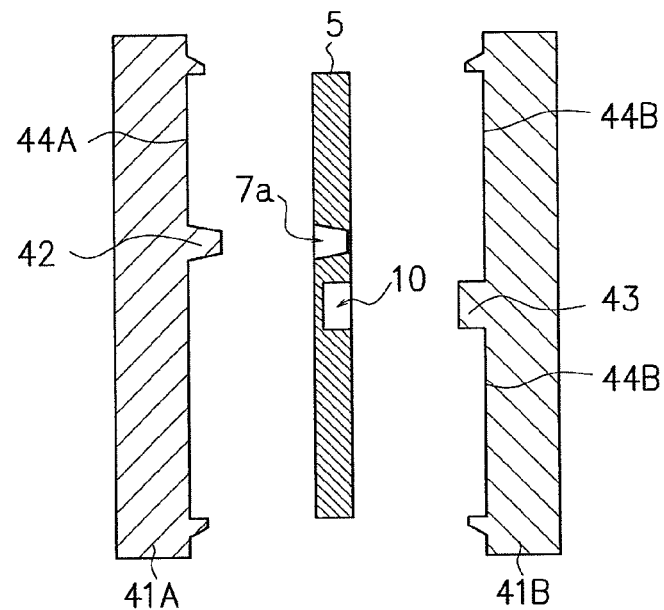
FIG. 7 is a third diagram showing a molding method example of the core member 5 and is a diagram showing a state in which the split molds 41 shown in FIG. 6 are opened.

Next, referring to FIGS. 5 to 8, description will be given of a production method example of the layered panel 1 of the present embodying mode. FIG. 5(a) shows a side-surface configuration example of the split molds 41 to mold the core member 5 (5A-5A cross-sectional diagram shown in FIG. 5(b)) and FIG. 5(b) is a diagram showing a configuration example in which the split molds 41 shown in FIG. 5(a) are viewed from the upper surface (the extruding head 40 side). FIG. 6 is a diagram showing a state in which the split molds 41 shown in FIG. 5(b) are closed. FIG. 7 is a diagram showing a state in which the split molds 41 shown in FIG. 6 are opened. FIG. 8 is a diagram showing a molding method example of the layered panel 1. Incidentally, for the method below, description will be given of a production method of the layered panel 1 configured without disposing the ornamental member 6.

First, as shown in (a) and (b) of FIG. 5, cylindrical resin P1 in a melted state is perpendicularly extruded downward from the extruding head 40 to mold the core member 5, to supply the cylindrical resin P1 to a space between the two split molds 41 at the open position. The resin P1 is resin to mold the core member 5.

Next, as FIG. 6 shows, by moving the two split molds 41 from the open position to the close position, the two split molds 41 are clamped. This configures a sealed space.

Next, through the sealed space thus configured, blow molding, vacuum molding, or both thereof is conducted such that the resin P1 in the sealed space is pushed toward a cavity 44 to be formed along the cavity 44.

In detail, for the blow molding, a blow pin (not shown) is inserted into the resin P1 to introduce pressurized fluid into the inside thereof, to thereby push the resin P1 toward the cavity 44. Further, for the vacuum blowing, a flow path (not shown) open to the cavity surface is disposed in the split molds 41, to suck the resin P1 via the flow path to the split molds 41.

As a result, the core member 5 is molded using the cylindrical resin P1. Further, as shown in FIG. 6, a housing forming section 43 disposed on a surface of one of the cavities 44B is inserted onto the front surface side of the core member 5 to compression-mold the core member 5, to thereby form the housing section 10 on the front surface side of the core member 5. The housing forming section 43 is used to form the housing section 10 in the core member 5. Further, a hinge forming section 42 disposed on a surface of the other one cavity 44A is inserted onto the rear surface side of the core member 5 to compression-mold the core member 5, to thereby form the hinge section 7a on the rear surface side of the core member 5. The hinge forming section 42 is used to form the hinge section 7a in the core member 5. Incidentally, it is favorable, as shown in FIG. 5(a), to dispose the housing forming section 43 and the hinge forming section 42 in the split molds 41 in the same direction as for the resin P1. This makes it possible to reduce occurrence of the broken section. However, it is also possible to dispose the housing forming section 43 and the hinge forming section 42 in the split molds 41 in a direction orthogonal to the resin P1.

Next, as FIG. 7 shows, the split molds 41 are moved from the close position to the open position, to unclamp the two split molds 41, and the molded core member 5 is removed from the space between the split molds 41. As a result, it is possible to mold the core member 5 including the housing section 10 and the hinge section 7a. Next, the reinforce member 9 is fitted into the housing section 10, to form the core member 5 in which the reinforce member 9 is fixed onto the housing section 10.

Next, as shown in FIG. 8, resin P2 in a melted state to configure the front wall 2 and the rear wall 3 of the layered panel 1 is extruded from a T die 60 of the extruding machine, to place the resin P2 in a melted state in a space between split molds 61. The resin P2 is resin to mold the front wall 2 and the rear wall 3.

Next, the resin P2 is pushed onto the cavity 62 of the split molds 61 by vacuum or under pressure for the molding thereof. And, the core member 5 in which the reinforce member 9 is fixed onto the housing section 10 is placed to make contact with an inner surface of the resin P2 pushed onto one of the cavities 62B and then clamping is performed; the resin P2 placed in each cavity 62 is then pinched by the pinch-off section of the split molds 61 to form a welded section in the entire circumference of the circumferential wall 4 of the layered panel 1, and the inner surface of the resin P2 in a melted state and an outer surface of the core member 5 are welded onto each other, to thereby mold the layered panel 1 wherein the core member 5 in which the reinforce member 9 is fixed onto the housing section 10 is installed as the interior using the front wall 2 and the rear wall 3. This makes it possible to obtain the layered panel 1 in which both surfaces of the core member 5 are covered with the resin P2.

Incidentally, the layered panel 1 described above may also be molded in a mode in which a pair of pre-molded blocks of resin are blow-molded.

Also, in the above production method, the core member 5 is molded by use of the cylindrical resin P1 in a melted state. However, the resin to mold the core member 5 is not limited to the cylindrical resin P1; it may also be molded by use of a tube-shaped or sheet-shaped resin P1 as a unit in a melted state.

Further, in the above production method, the front wall 2 and the rear wall 3 are molded by use of single-layer resin P1 in a melted state. However, they may be molded by use of multi-layer resin P2.

Incidentally, in the above production method, when the layered panel 1 in which the ornamental member 6 is disposed is molded; before the split molds 61 shown in FIG. 8 are clamped, the ornamental member 6 is placed between one of the blocks of resin P2 and the split mold 61A, to press the ornamental member 6 and the resin P2 onto the cavity 62A of the split mold 61A by vacuum or under pressure. This makes it possible to mold the layered panel 1 including the ornamental member 6 on the upper surface of the front wall 2. Incidentally, the ornamental member 6 may be adhered onto the upper surface of the front wall 2 after the production method is finished.

<Operation and Effects of Layered Panel 1 of Present Embodying Mode>

As above, for the layered panel 1 of the present embodying mode, the core member 5 is molded by compressing a part of the core member 5 to form the hinge section 7a, the core member 5 and the resin P2 in a melted state to configure the front wall 2 and the rear wall 3 of the layered panel 1 are clamped by the split molds 61, and the core member 5 and the resin P2 are welded onto each other, to thereby mold the layered panel 1 including the hinge 7 including the hinge section 7a formed using the core member 5 interposed between the front wall 2 and the rear wall 3. Since the hinge 7 of the layered panel 1 of the present embodying mode includes the hinge section 7a found using the core member 5 interposed between the front wall 2 and the rear wall 3, strength of the hinge 7 can be enhanced regardless of the kinds of the substrates configuring the front wall 2 and the rear wall 3 of the layered panel 1. That is, in the layered panel 1 of the present embodying mode, the hinge 7 is configured by including the core member 5; hence, strength of the hinge 7 can be enhanced regardless of the kinds of the substrates configuring the front wall 2 and the rear wall 3 of the layered panel 1.

Incidentally, in the present embodying mode, the core member 5 is beforehand molded by compressing a part of the core member 5 to form the hinge section 7a, the core member 5 and the resin P2 in a melted state to configure the front wall 2 and the rear wall 3 of the layered panel 1 are clamped by the split molds 61, and the core member 5 and the resin P2 are welded onto each other, to thereby mold the layered panel 1 including the hinge 7 including the hinge section 7a formed using the core member 5. However, it is also possible that without beforehand molding the core member 5 in which the hinge section 7a is formed, the hinge section 7a is molded, when the core member 5 and the resin P2 are clamped, by compressing a part of the core member 5 by the split molds 61. In this situation, the hinge section 7a is formed by use of the hinge forming section to form the hinge 7. The hinge forming section is used to form the hinge 7 and is disposed in the split molds 61. This hinge forming section also serves the function of the hinge section forming section 42 shown in (a) and (b) of FIG. 5, to form the hinge 7 including the hinge section 7a.

Further, in the present embodying mode, the ornamental member 6 is adhered onto the upper surface of the front wall 2 of the layered panel 1. However, it is also possible that by omitting the ornamental member 6, the upper surface of the front wall 2 is directly exposed.

Figure 10:
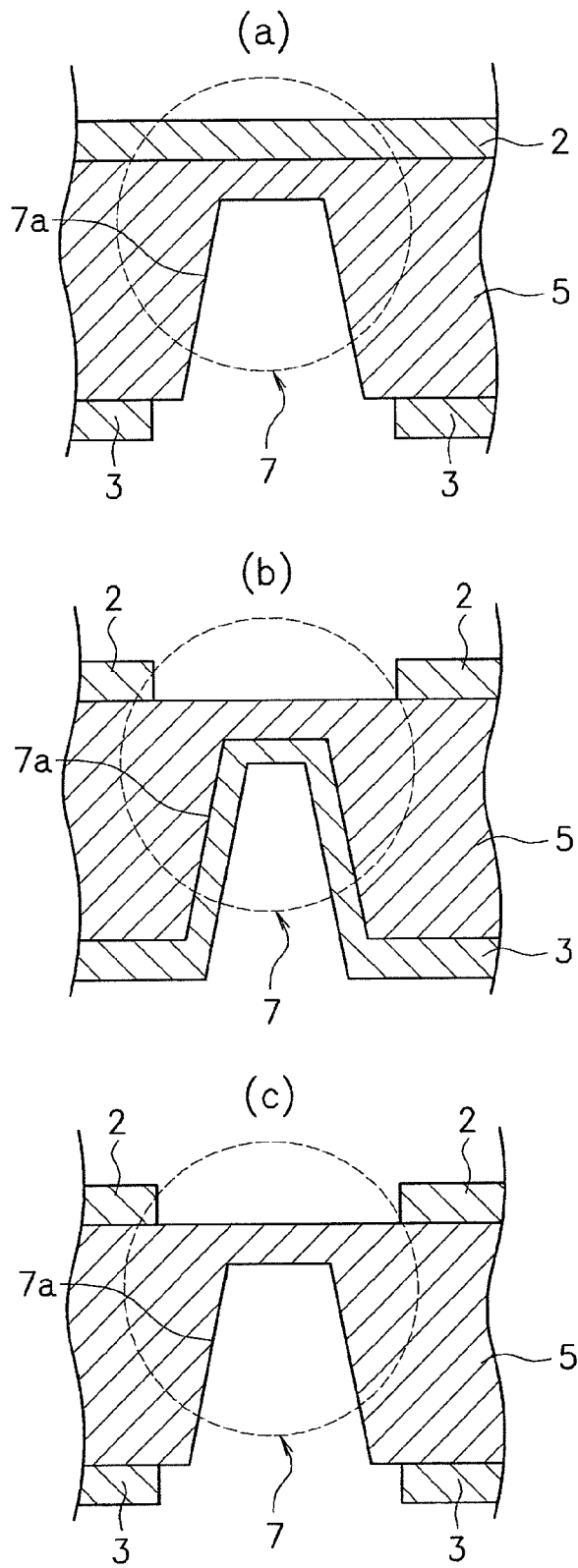
FIG. 10 is a second diagram showing a configuration example of the hinge 7.

Additionally, in the present embodying mode, the core member 5 is entirely covered with the front wall 2 and the rear wall 3 in the configuration, to form the hinge section 7a using the part of the core member 5 covered with the front wall 2 and the rear wall 3. However, it is also possible that a part of the core member 5 is covered with the front wall 2 and the rear wall 3 in the configuration, and as shown in (a) and (b) of FIG. 10, the hinge section 7a is formed using the part of the core member 5 covered with the front wall 2 or the rear wall 3 in the configuration. In this situation, as shown in (a) and (b) of FIG. 10, the part of the hinge section 7a formed using the core member 5 is covered with the front wall 2 or the rear wall 3, to configure the hinge 7 in the configuration. FIG. 10(*a*) shows a situation in which the hinge 7 is configured using the front wall 2 and the core member 5 and FIG. 10(*b*) shows a situation in which the hinge 7 is configured using the rear wall 3 and the core member 5.

Also, it is possible that only the part of the hinge section 7a formed using the core member 5 is not covered with the front wall 2 and the rear wall 3 in the configuration, and as shown in FIG. 10(*c*), the hinge 7 is configured only by the hinge section 7a formed using the core member 5.

Hence, the hinge section 7a of the present embodying mode may be formed using the part of the core member 5 covered with at least either one of the front wall 2 and the rear wall 3 or the part of the core member 5 not covered with the front wall 2 and the rear wall 3 in the configuration. That is, the layered panel 1 of the present embodying mode may be configured in any configuration if the hinge 7 is configured including the core member 5.

Further, in the present embodying mode, the core member 5 has been described using the solid configuration as an example. However, for the core member 5, as shown, for example, in FIG. 4 of patent document 2 (WO2009/136489), a plurality of depressions may be disposed in the core member 5. Further, as shown in FIG. 5 of patent document 2, a through hole may be disposed in the core member 5. That is, the configuration of the core member 5 is not limited to the solid configuration; it is also possible that part thereof is hollow and part thereof is solid; it is possible that a hollow section and a solid section are appropriately disposed according to contours and allocation positions of the hinge section 7a and the housing section 10 disposed in the core member 5 of the present embodying mode. Incidentally, in the core member 5 of the present embodying mode, to form the hinge section 7a and the housing section 10, it is favorable to dispose holes such as a hollow section in the periphery thereof. As a result, even when the hinge section 7a and the housing section 10 are formed by use of the resin P1 to form the core member 5, it is possible to secure an escape area for the resin in the part to form them; hence, it is possible to prevent occurrence of collected excessive resin.

(Second Embodying Mode)

Next, description will be given of the second embodying mode.

The hinge 7 of the layered panel 1 of the first embodying mode is configured, as FIG. 3(a) shows, by including the hinge section 7a formed by the core member 5 interposed between the front wall 2 and the rear wall 3. That is, the hinge 7 is configured by including the core member 5.

Figure 11:
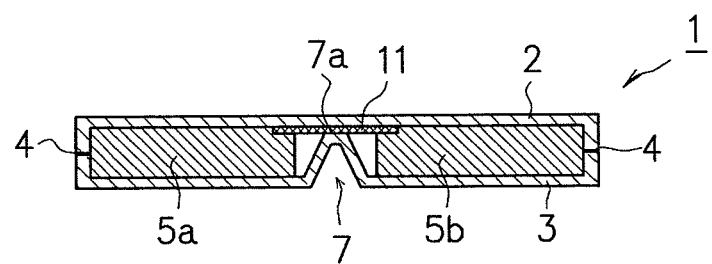
FIG. 11 is a diagram showing a configuration example of the layered panel 1 in a second embodying mode.

The hinge 7 of the layered panel 1 of the second embodying mode is configured, as FIG. 11 shows, by including the hinge section 7a formed by non-woven fabric 11 interposed between the front wall 2 and the rear wall 3. In the hinge 7 of the layered panel 1 of the second embodying mode, the non-woven fabric 11 is interposed between the front wall 2 and the rear wall 3 of the layered panel 1, to configure the hinge section 7a by the non-woven fabric 11. That is, the hinge 7 is configured by including the non-woven fabric 11. Hence, as in the first embodying mode, the strength of the hinge 7 can be enhanced regardless of the kinds of the substrates configuring the front wall 2 and the rear wall 3 of the layered panel 1. Next, referring to FIG. 11, description will be given of the layered panel 1 of the second embodying mode. FIG. 11 shows a cross-sectional configuration example of the layered panel 1 and shows the part corresponding to FIG. 3 (a).

The layered panel 1 of the present embodying mode is configured, as FIG. 11 shows, by including a front wall 2, a rear wall 3, a circumferential wall 4, core members 5a and 5b, and non-woven fabric 11. In the layered panel 1 of the present embodying mode, two core members 5a and 5b interposed between the front wall 2 and the rear wall 3 are linked by the non-woven fabric 11 to each other, and the non-woven fabric 11 configures the hinge section 7a. In the hinge 7 of the layered panel 1 of the present embodying mode, since the non-woven fabric 11 interposed between the front wall 2 and the rear wall 3 configures the hinge section 7a, even when the layered panel 1 is rotated about the hinge section 7a as the rotary axis, cracks, wrinkles, and the like do not occur in the hinge section 7a itself. As a result, the strength of the hinge 7 can be enhanced regardless of the kinds of the substrates configuring the front wall 2 and the rear wall 3 of the layered panel 1.

The material to configure the non-woven fabric 11 is not particularly limited only if it does not cause occurrence of cracks, wrinkles, and the like in the hinge section 7a itself when the layered panel 1 is rotated about the hinge section 7a as the rotary axis, and any known material is applicable. For example, natural fiber, reprocessed fiber, semi-synthetic fiber, synthetic fiber, and fiber obtained by blending these fibers are selectable according to necessity. When the non-woven fabric 11 is configured using these materials, it is possible to prevent occurrence of cracks, wrinkles, and the like in the hinge section 7a itself formed by the non-woven fabric 11.

When molding the layered panel 1 of the present embodying mode; as FIG. 12(a) shows, resin P2 in a melted state to configure the front wall 2 and the rear wall 3 of the layered panel 1 is placed between the split molds 61. And, the resin P2 is pressed toward the cavities 62 of the split molds 61 by vacuum or under pressure. Next, the core members 5a and 5b are placed to make contact with one of the blocks of resin P2 and the non-woven fabric 11 is placed at the part to configure the hinge 7 to make contact with an inner surface of the other one of the blocks of resin P2. Thereafter, as shown in FIG. 12(b), clamping is performed such that the resin P2 placed in each cavity 62 is pinched by the pinch-off section of the split molds 61 to form a welded section in the entire circumference of the circumferential wall 4 of the layered panel 1. This makes it possible to link the non-woven fabric 11 to the core members 5a and 5b. Also, it is possible to weld the inner surface of the resin P2 in a melted state and the outer surfaces of the core members 5a and 5b onto each other. Further, it is possible to weld the inner surface of the resin P2 in a melted state and the non-woven fabric 11 onto each other. As a result, it is possible to form the layered panel 1 in which the core members 5a and 5b linked by the non-woven fabric 11 to each other are installed as the interior by the front wall 2 and the rear wall 3.

Figure 12:
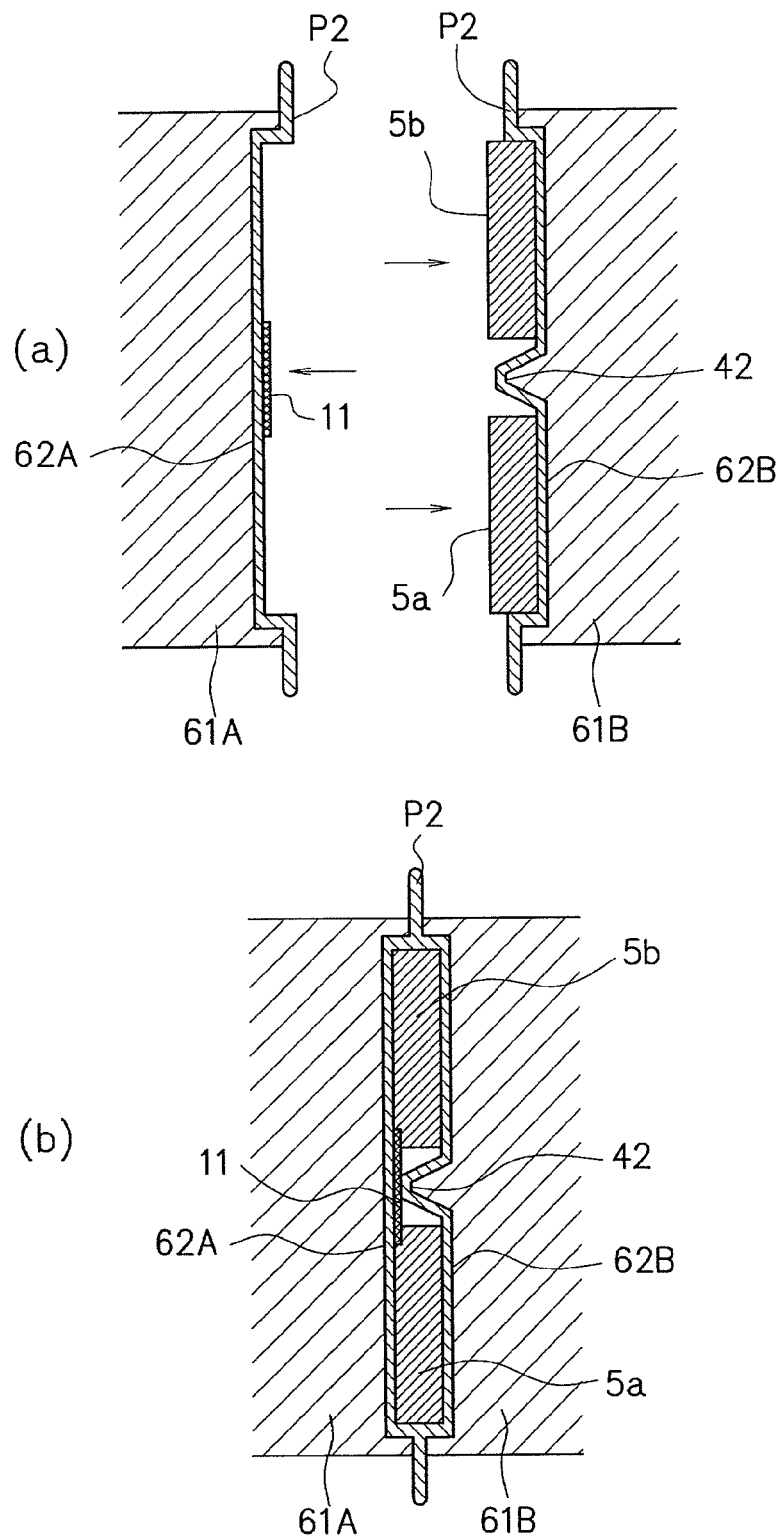
FIG. 12 is a diagram showing a molding method example of the layered panel 1 in the second embodying mode.

In the present embodying mode, by conducting the processes shown in (a) and (b) of FIG. 12, it is possible to obtain the layered panel 1 in which both surfaces of the core members 5a and 5b linked by the non-woven fabric 11 to each other are covered with the resin P2.

<Operation and Effects of Layered Panel 1 of Present Embodying Mode>

As above, for the layered panel 1 of the present embodying mode, the core members 5a and 5b and the non-woven fabric 11 are placed between the blocks of resin P2 in a melted state to configure the front wall 2 and the rear wall 3 of the layered panel 1, and then the resin 2, the core members 5a and 5b, and the non-woven fabric 11 are clamped by the split molds 61. This makes it possible to link the core members 5a and 5b by the non-woven fabric 11 to each other and to weld the core members 5a and 5b and the non-woven fabric 11 onto the resin P2, to thereby mold the layered panel 1 including the hinge section 7a configured by the non-woven fabric 11 interposed between the front wall 2 and the rear wall 3. Since the hinge 7 of the layered panel 1 of the present embodying mode includes the hinge section 7a formed by the non-woven fabric 11 interposed between the front wall 2 and the rear wall 3, the strength of the hinge 7 can be enhanced regardless of the kinds of the substrates configuring the front wall 2 and the rear wall 3 of the layered panel 1. That is, in the layered panel 1 of the present embodying mode, the hinge 7 is configured by including the non-woven fabric 11, the strength of the hinge 7 can be enhanced regardless of the kinds of the substrates configuring the front wall 2 and the rear wall 3 of the layered panel 1.

Figure 13:
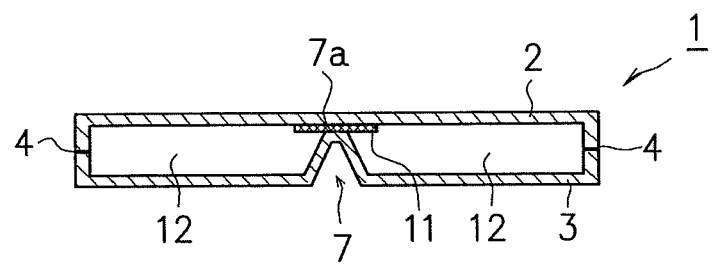
FIG. 13 is a diagram showing another configuration example of the layered panel 1 in the second embodying mode.

Incidentally, in the layered panel 1 shown in FIG. 11, the core members 5a and 5b are interposed between the front wall 2 and the rear wall 3. However, it is also possible that without interposing the core members 5a and 5b, a hollow section 12 is formed, as FIG. 13 shows, between the front wall 2 and the rear wall 3. The hollow section 12 may be formed in the known method disclosed in patent document 2 (WO2009/136489) and the like.

Also in the situation of the configuration of the layered panel 1 shown in FIG. 13, as in the layered panel 1 shown in FIG. 11, the non-woven fabric 11 is interposed between the front wall 2 and the rear wall 3 to form the hinge section 7a by the non-woven fabric 11. Also in the situation of the configuration of the layered panel 1 shown in FIG. 13, since the hinge section 7a is formed by the non-woven fabric 11 interposed between the front wall 2 and the rear wall 3, the strength of the hinge 7 can be enhanced regardless of the kinds of the substrates configuring the front wall 2 and the rear wall 3 of the layered panel 1. Incidentally, in the situation wherein as shown in FIGS. 11 and 13, the hinge section 7a is formed by the non-woven fabric 11, it is possible that the hinge section 7a is configured by interposing the non-woven fabric 11 in the overall section to configure the hinge 7 or the hinge section 7a is configured by interposing the non-woven fabric 11 partly in the section to configure the hinge 7. Hence, if the hinge section 7*a* is configured by interposing the non-woven fabric 11 at least partly in the section to configure the hinge 7, it is possible that locations to interpose the non-woven fabric 11 are not particularly restricted, and the non-woven fabric 11 is interposed at arbitrary locations in the configuration. Incidentally, the hinge section 7*a* formed by the non-woven fabric 11 is favorably formed by compressing the non-woven fabric 11. As a result, it is possible to protect the insides of the front wall 2 and the rear wall 3 in the vicinity of the hinge section 7*a* by the non-woven fabric 11 not compressed.

Incidentally, also in the layered panel 1 of the first embodying mode shown in FIG. 3(*a*), it is possible that the non-woven fabric 11 is interposed, for example, between the hinge section 7*a* formed by the core member 5 and the front wall 2 or the rear wall 3, and the hinge section 7*a* is configured by the interposed non-woven fabric 11 in the configuration.

(Third Embodying Mode)

Next, description will be given of the third embodying mode.

Figure 15:
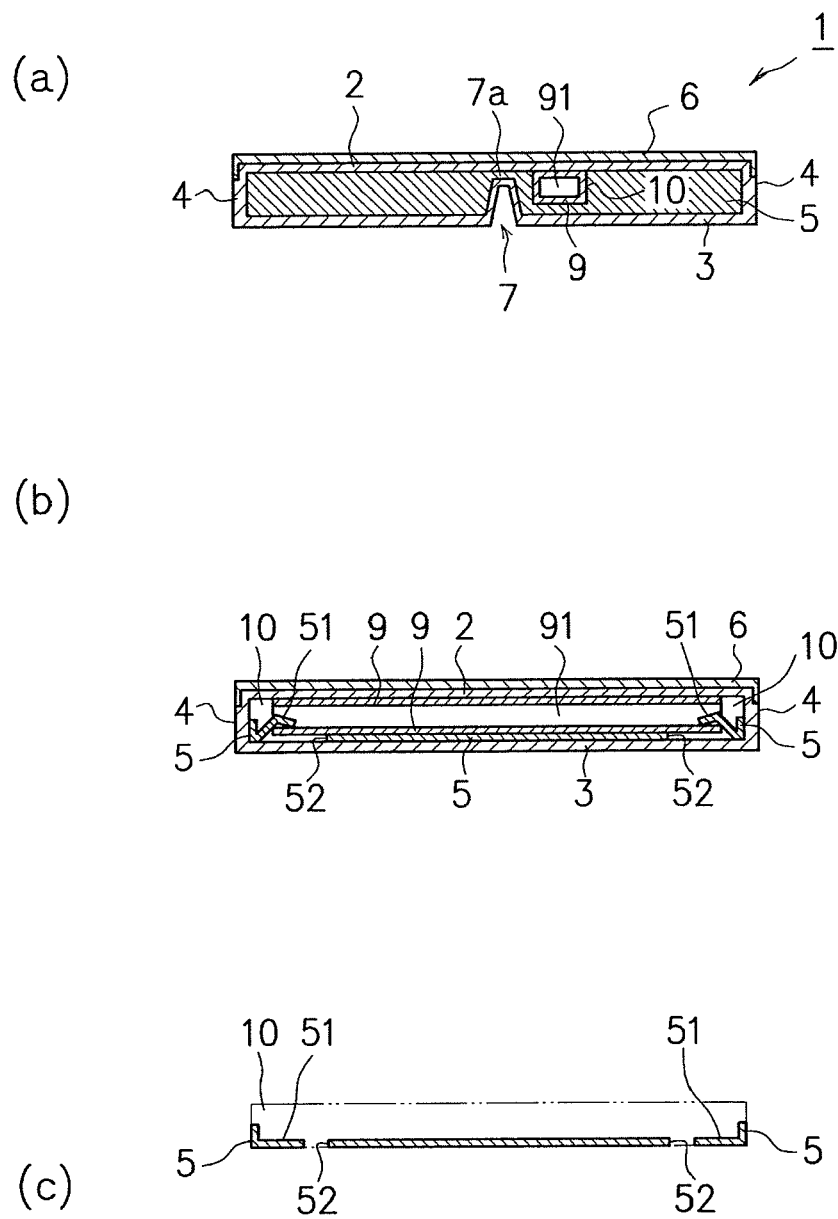
FIG. 15 shows cross-sectional diagrams of the layered panel 1 and the core member 5 in the third embodying mode, and (a) is a cross-sectional diagram of the layered panel 1 taken along line 15A-15A shown in FIG. 14(a), (b) is a cross-sectional diagram of the layered panel 1 taken along line 15B-15B shown in FIG. 14(a), and (c) is a cross-sectional diagram of the core member 5 taken along line 15B-15B shown in FIG. 14(a).

The layered panel 1 of the present embodying mode is a layered panel 1 in which, as FIG. 15 shows, at least one surface of the core member 5 is covered with other one member. The other one member indicates the front wall 2 or the rear wall 3.

The layered panel 1 of the present embodying mode includes, as FIG. 15(*b*) shows, a holding section 51 formed by deforming the core member 5, and the reinforce member 9 housed in the core member 5 is held by the holding section 51. The holding section 51 means, for example, a click section 51 or the like.

Figure 17:
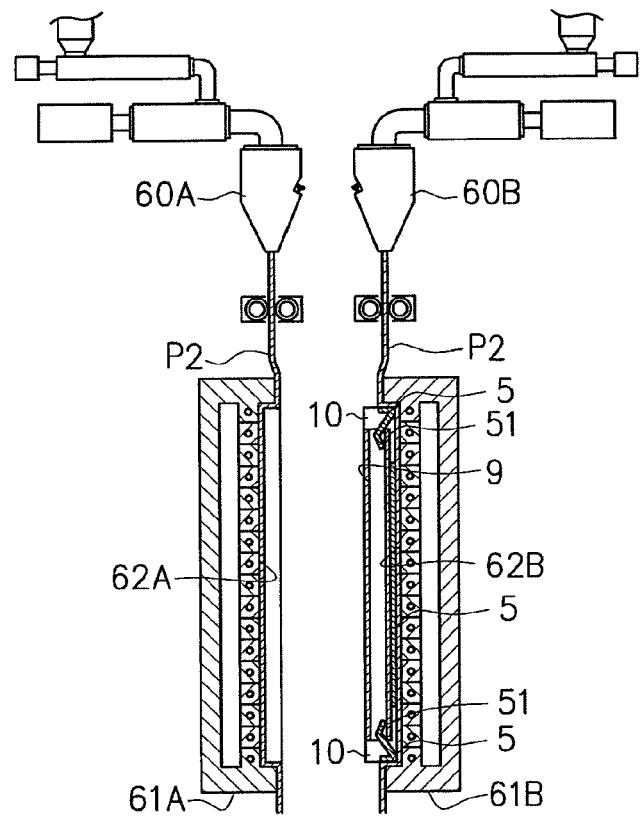
FIG. 17 is a diagram showing a molding method example of the layered panel 1.

The layered panel 1 of the present embodying mode can be molded, as FIG. 17 shows, by clamping the core member 5 in which the reinforce member 9 housed in the core member 5 is held by the holding section 51 formed by deforming the core member 5 and the resin P2 in a melted state to configure the other member 2, 3 by the split molds 61 and then by welding the core member 5 and the resin P2 onto each other.

In the layered panel 1 of the present embodying mode, the reinforce member 9 housed in the core member 5 is held by the holding section 51 formed by deforming the core member 5; hence, even when an arbitrary reinforce plate 9 is housed in the core member 5, it is possible to obtain the layered panel 1 in which the reinforce plate 9 is not easily removed from the core member 5.

The reinforce member 9 of the present embodying mode is configured, as FIG. 15(*a*) shows, in a cylindrical contour and includes at least an opening section 91 at an end section thereof. Incidentally, the cross-sectional contour of the reinforce member 9 is not limited to the cylindrical contour, but may be configured in contours including, for example, an H shape, a C shape, a ] shape, and the like. However, the reinforce member 9 is favorably configured, in contours including an H shape, a C shape, a ] shape, and the like, by including at least the opening section 91 at an end section thereof. Due to the configuration including the opening section 91, when the reinforce member 9 is housed in the housing section 10, it is possible that a click section 51 (reference is to be made to (b) and (c) of FIG. 15), which will be described later, is inserted in the opening section 91 of the reinforce member 9 and the reinforce member 9 is fixed by use of the click section 51, to thereby hold the reinforce member 9 in the housing section 10. The contour of the opening section 91 is not particularly limited; any contour may be used in the configuration only if it can be fixed by the click section 51 as the holding section.

The housing section 10 is configured, as FIG. 15 shows, through depressing in a direction from the surface on the front wall 2 side of the core member 5 to that of the rear wall 3 side. Incidentally, the housing section 10 holds the reinforce member 9 by fitting it therein and is hence favorably formed in the core member 5 in a contour corresponding to the reinforce member 9.

Further, in the core member 5 of the present embodying mode, as shown in (b) and (c) of FIG. 15, there is formed the click section 51 as the holding section to hold the reinforce member 9 such that the end section of the reinforce member 9 housed in the housing section 10 is fixed by the click section 51, to thereby hold the reinforce member 9.

Figure 14:
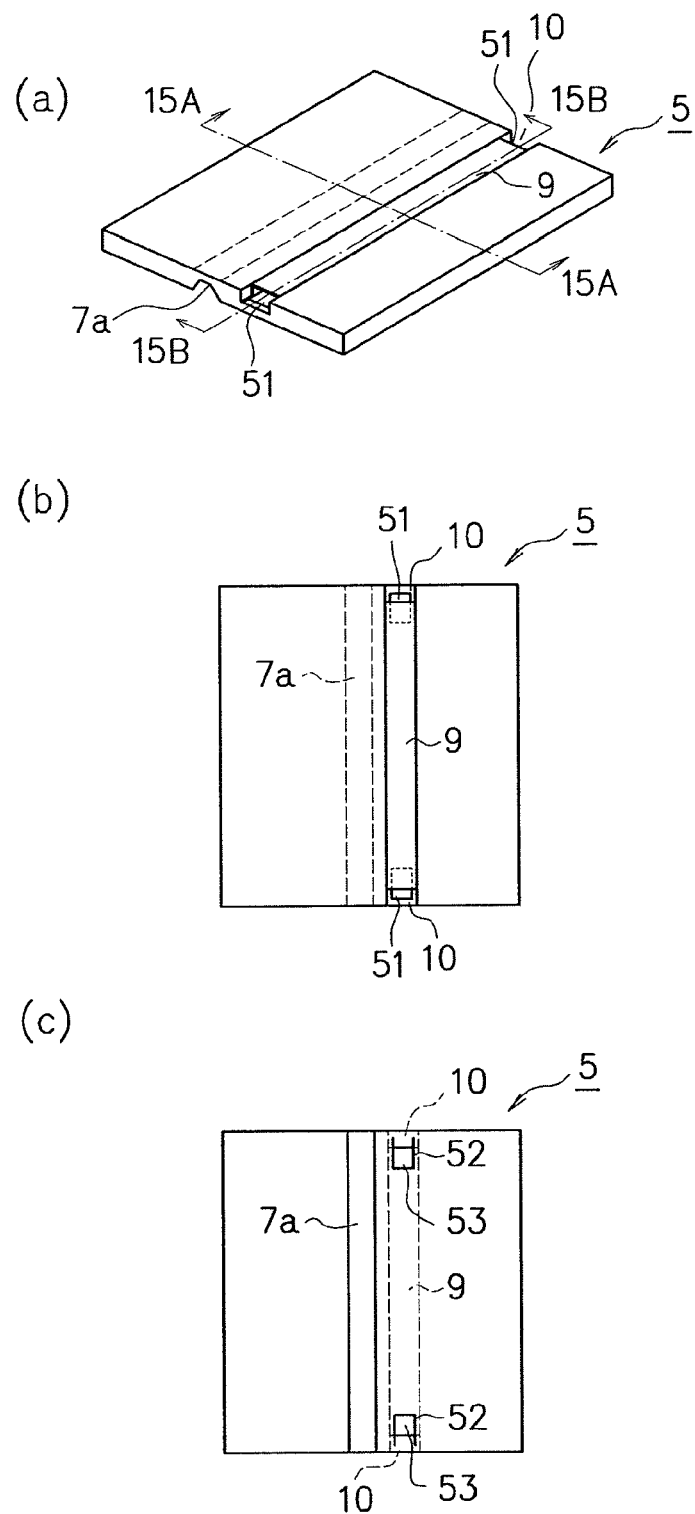
FIG. 14 is a diagram of a core member 5 configuring the layered panel 1 in a third embodying mode, and (a) is an overall perspective view, (b) is a top view, and (c) is a rear view.

The click section 51 is formed, as shown in (a) and (b) of FIG. 14 and (b) and (c) of FIG. 15, at end sections in the longitudinal direction of the housing section 10, and as shown in FIG. 14 and FIG. 15(*b*), the end sections in the longitudinal direction of the reinforce member 9 are fixed by the click sections 51. The click section 51 is formed, as shown in FIGS. 14(*c*), (*b*) and (*c*) of FIG. 15, and FIG. 16(*a*), by disposing a notch 52 in a part (for example, the housing section 10) of the core member 5. When fixing the reinforce member 9 by the click section 51; first, as FIG. 16(*b*) shows, the click section 51 is once made to stand, and then as FIG. 16(*c*) shows, the opening section 91 of the reinforce member 9 is inserted in the click section 51. And, in the state in which the opening section 91 of the reinforce member 9 is inserted in the click section 51, the reinforce member 9 is fitted, as FIG. 16(*d*) shows, in the housing section 10 to be placed therein. Resultantly, as shown in FIG. 14 and FIG. 15(*b*), it is possible that the end sections in the longitudinal direction of the reinforce member 9 are fixed by the click sections 51 such that the reinforce member 9 is not removed from the housing section 10, to keep the state in which the reinforce member 9 is held in the housing section 10. Incidentally, to fix the reinforce member 9 by the click section 51, it is favorable that the tip end of the click section 51 is bent to fix the reinforce member 9 by the bent tip end of the click section 51. As a result, since the tip end of the click section 51 pushes the reinforce member 9 toward the housing section 10 side, the reinforce member 9 can be easily held in the housing section 10.

The click section 51 may be formed, when forming the housing section 10 section in the core member 5, by simultaneously disposing the notch 52 or may be formed, after the housing section 10 is formed, by disposing the notch 52 in another process. For example, it is possible that while forming the housing section 10 in the core member 5 by use of the split molds, the notch 52 is disposed by use of the pinch-off section of the split molds. Incidentally, in the core member 5 of the present embodying mode, the click section 51 is formed by disposing the notch 52 at the end sections in the longitudinal direction of the housing section 10; hence, as shown in FIG. 14(*c*) and FIG. 16(*e*), the opening section 53 is formed on the rear surface side of the core member 5. Hence, when the reinforce member 9 is placed in the housing section 10 of the core member 5, it is possible, as shown in FIG. 14(*c*) and FIG. 16(*e*), to view the reinforce member 9 from the opening section 53 on the rear surface side of the core member 5. Incidentally, the contour of the click section 51 is not particularly limited only if it can fix the reinforce member 9, and it can be configured in any contour. Further, the number of click sections 51 disposed at both ends in the longitudinal direction of the housing section 10 is not particularly limited, and a plurality of click sections 51 may be disposed at both ends in the longitudinal direction of the housing section 10. However, when disposing a plurality of click sections 51 at both ends, it is required to reduce the size of each click section 51.

Moreover, in the core member 5 of the present embodying mode, there is formed, as shown in FIGS. 14 and 15(*a*), a depression-shaped hinge section 7*a* substantially at the central position of the core member 5, to configure the hinge 7 of the layered panel 1. The layered panel 1 of the present embodying mode is rotatable about the hinge 7, configured by including the hinge section 7*a*, as the rotary axis. The hinge section 7*a* shown in FIG. 14 is formed in a linear contour and is continuously disposed in the core member 5. The hinge section 7*a* is formed on the rear surface side of the core member 5; hence, in the drawings shown in (a) and (b) of FIG. 14 (a perspective view and a top view), the position at which the hinge section 7*a* is formed is indicated by dotted lines. Further, in the drawing shown in FIG. 14(*c*) (a rear view), it is indicated by solid lines.

In the layered panel 1 of the present embodying mode, the housing section 10 is disposed in the vicinity of the hinge section 7*a* and the reinforce member 9 is placed in the housing section 10. Hence, the strength of areas near the hinge 7 can be enhanced by the reinforce member 9.

<Layered Panel 1 Manufacturing Method Example>

Figure 16:
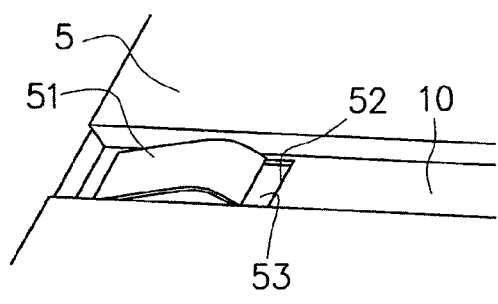
FIG. 16 is a diagram to explain a case wherein a reinforce member 9 is housed in a housing section 10 of the core member 5.
Figure 16:
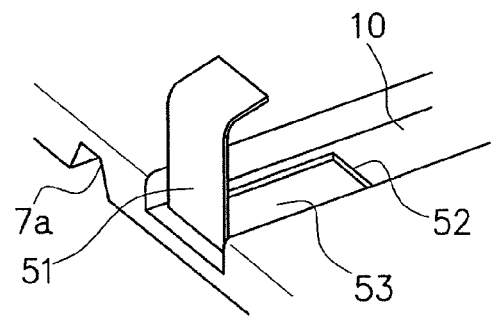
Figure 16:
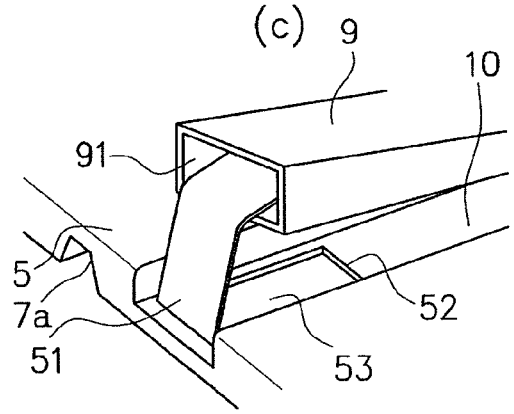
Figure 16:
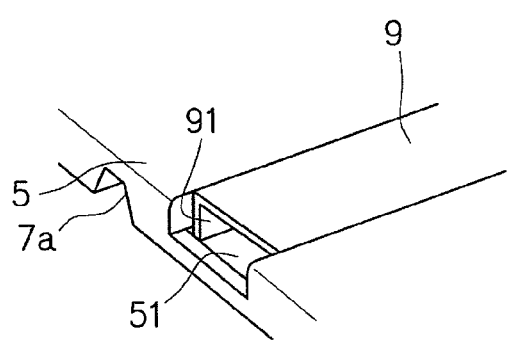
Figure 16:
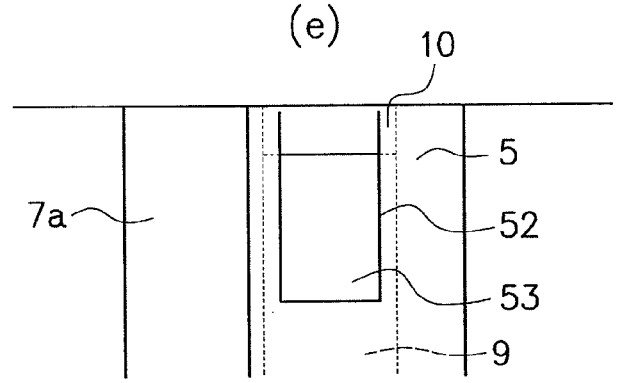

Next, referring to FIGS. 5 to 7 and FIGS. 16 and 17, description will be given of a production method example of the layered panel 1 of the present embodying mode. FIG. 5(*a*) shows a side-surface configuration example of the split molds 41 to mold the core member 5 (5A-5A cross-sectional diagram shown in FIG. 5(*b*)) and FIG. 5(*b*) is a diagram showing a configuration example in which the split molds 41 shown in FIG. 5(*a*) are viewed from the upper surface (the extruding head 40 side). FIG. 6 is a diagram showing a state in which the split molds 41 shown in FIG. 5(*b*) are closed. FIG. 7 is a diagram showing a state in which the split molds 41 shown in FIG. 6 are opened. FIG. 16 is a diagram showing a molding method example of the click section 51. FIG. 17 is a diagram showing a molding method example of the layered panel 1. Incidentally, for the method below, description will be given of a production method of the layered panel 1 configured without disposing the ornamental member 6.

First, as shown in (a) and (b) of FIG. 5, cylindrical resin P1 in a melted state is perpendicularly extruded downward from the extruding head 40 to mold the core member 5, to supply the cylindrical resin P1 in a melted state to a space between the two split molds 41 at the open position.

Next, as FIG. 6 shows, by moving the two split molds 41 from the open position to the close position, the two split molds 41 are clamped. This configures a sealed space.

Next, through the sealed space thus configured, blow molding, vacuum molding, or both thereof is conducted such that the resin P1 in the sealed space is pushed toward a cavity 44 to be formed along the cavity 44. As a result, the core member 5 is molded using the cylindrical resin P1 in a melted state. Further, as shown in FIG. 6, a housing forming section 43 disposed on a surface of one of the cavities 44B is inserted onto the front surface side of the core member 5 to compression-mold the resin P1, to thereby form the housing section 10 on the front surface side of the core member 5. Further, a hinge forming section 42 disposed on a surface of the other one cavity 44A is inserted into the rear surface side of the core member 5 to compression-mold the resin P1, to thereby form the hinge section 7*a* on the rear surface side of the core member 5. The hinge forming section 42 is used to form the hinge section 7*a* in the core member 5.

Next, as FIG. 7 shows, the split molds 41 are moved from the close position to the open position, to unclamp the two split molds 41, and the molded core member 5 is removed from the space between the split molds 41. As a result, it is possible to mold the core member 5 including the housing section 10 and the hinge section 7*a*.

Next, as FIG. 16(*a*) shows, a notch 52 is manually disposed at an end section in the longitudinal direction of the housing section 10, to form a click section 51. In this situation, the click section 51 is cut in a flat state. And as FIG. 16(*b*) shows, the click section 51 is once manually made to stand. As a result, the click section 51 is bent to form an inflection. Next, as FIG. 16(*c*) shows, the opening section 91 of the reinforce member 9 is inserted onto the click section 51, and in the state in which the opening section 91 of the reinforce member 9 is inserted onto the click section 51, the reinforce member 9 is fitted, as shown in FIG. 16(*d*), in the housing section 10 to be placed therein. As a result, it is possible to form the core member 5 in which the reinforce member 9 is held. The core member 5 of the present embodying mode includes the click section 51 at the end sections in the longitudinal direction of the housing section 10, and the reinforce member 9 housed in the housing section 10 is fixed to be held by use of the click section 51; hence, the reinforce member 9 cannot be easily removed from the core member 5.

Next, as shown in FIG. 17, resin P2 in a melted state to configure the front wall 2 and the rear wall 3 of the layered panel 1 is extruded from a T die 60 of the extruding machine, to place the resin P2 in a melted state in a space between split molds 61.

Next, the resin P2 is pushed onto the cavity 62 of the split molds 61 by vacuum or under pressure for the molding thereof. Next, the core member 5 holding the reinforce member 9 is placed in one of the cavities 62B to make contact with an inner surface of the sheet-shaped resin P2 to conduct clamping; the resin P2 placed in each cavity 62 is then pinched by the pinch-off section of the split molds 61 to form a welded section in the entire circumference of the circumferential wall 4 of the layered panel 1, and the inner surface of the resin P2 in a melted state and an outer surface of the core member 5 are welded onto each other, to thereby mold the layered panel 1 in which the core member 5 holding the reinforce member 9 is installed as the interior using the front wall 2 and the rear wall 3. This makes it possible to obtain the layered panel 1 in which both surfaces of the core member 5 are covered with the resin P2.

Incidentally, in the production method, the notch 52 is manually disposed at the end sections in the longitudinal direction of the housing section 10, to form the click sections 51. However, the click sections 51 may be formed by disposing notches 52 by the spit molds 41.

Figure 18:
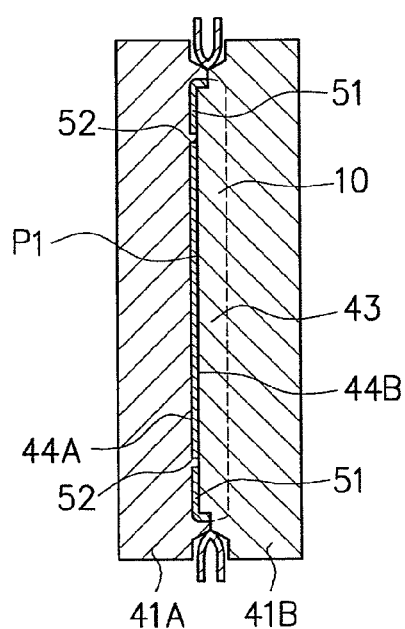
FIG. 18 is a diagram showing a molding method example of the core member 5 and is a diagram showing a state in which the split molds 41 shown in FIG. 5(a) are closed (part of a housing forming section 43).

In this situation, as FIG. 18 shows, the pinch-off sections of the respective split molds 41 are brought into contact with each other to form a parting line in the periphery of the core member 5 and the notch 52 is disposed at the end sections of the housing section 10 formed in the core member 5 by use of the housing forming section 43, to thereby form the click sections 51 at the end sections of the housing section 10. This makes it possible to mold the core member 5 including the housing section 10, the click sections 51, and the hinge sections 7*a*. FIG. 18 is a diagram showing a state in which the split molds 41 shown in FIG. 5(*a*) are closed and is a diagram showing a configuration example of a part of the housing forming section 43. Incidentally, although the bent section of the click section 51 may be beforehand formed when the core member 5 is molded, it is favorable to bend the tip end of the click section 51 after the molding. By bending the linear click section 51 thereafter, the fixing of the reinforce member 9 can be enhanced by its elastic restoring force.

<Operation and Effects of Layered Panel 1 of Present Embodying Mode>

As above, for the layered panel 1 of the present embodying mode, there is molded the core member 5 including the click sections 51 formed by deforming the core member 5 and the reinforce member 9 is housed in the core member 5, to thereby form the core member 5 in which the reinforce member 9 is fixed by the click sections 51. Next, the core member 5 in which the reinforce member 9 is fixed by the click sections 51 and the resin P2 are clamped by the split molds 61, to thereby mold the layered panel 1. As a result, even when an arbitrary reinforce plate 9 is housed in the core member 5, it is possible to provide the layered panel 1 in which the reinforce member 9 is not easily removed from the core member 5.

(Fourth Embodying Mode)

Next, description will be given of the fourth embodying mode.

In the third embodying mode, the click section 51 is formed as shown in FIG. 15(*b*) by disposing the notch 52 in the core member 51, and the reinforce member 9 is fixed by the click section 51.

Figure 19:
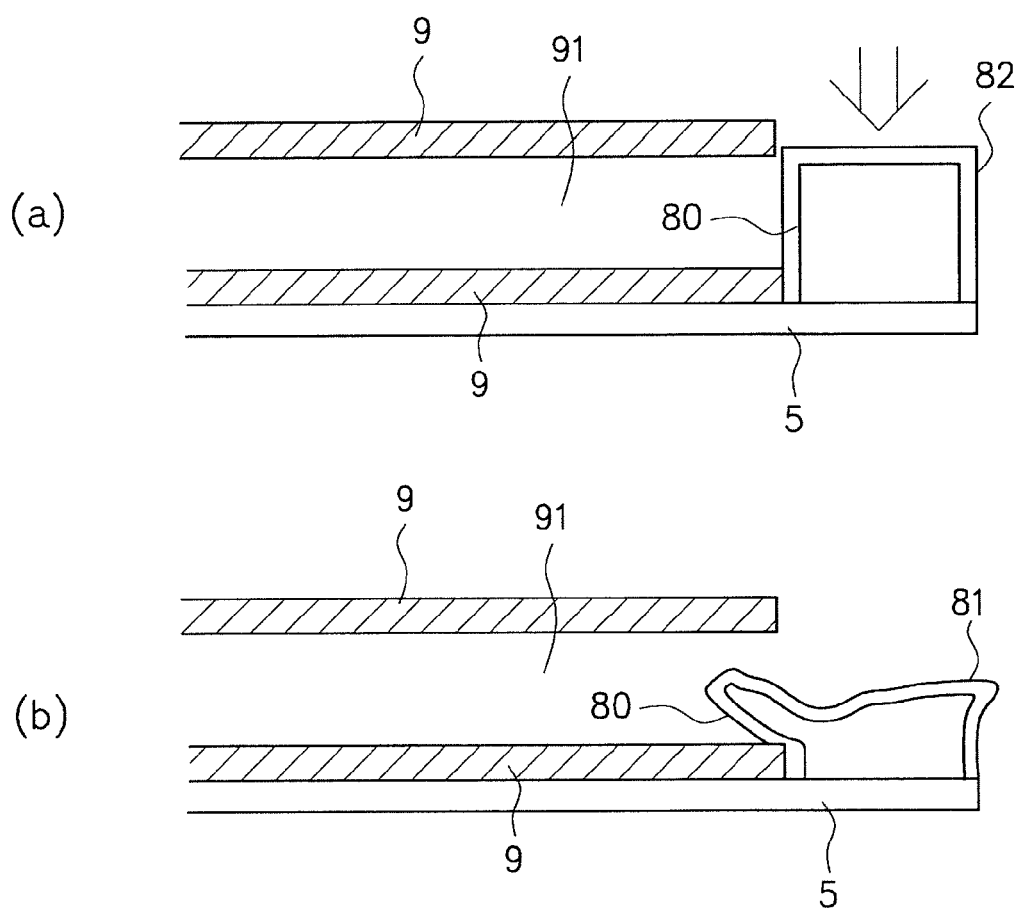
FIG. 19 is a first diagram showing a configuration example of the core member 5 in a fourth embodying mode.

In the fourth embodying mode, a projection 81 is formed as shown in FIG. 19(*b*) by crashing a part of the core member 51, to fix the reinforce member 9 by the projection 81. Hence, even when an arbitrary reinforce plate 9 is housed in the core member 5, it is possible as in the third embodying mode to provide the layered panel 1 in which the reinforce member 9 is not easily removed from the core member 5. Next, referring to FIG. 19, description will be given of the fourth embodying mode.

<Core Member 5 Configuration Example>

First, referring to FIG. 19, description will be given of a configuration example of the core member 5 of the present embodying mode.

In the core member 5 of the present embodying mode, a projection 81 is formed as shown in FIG. 19(*b*) by crashing a part of the core member 51, and the projection 81 is inserted in the opening section 91 of the reinforce plate 9, to fix the reinforce plate 9 by the projection 81. The part to form the projection 81 includes as shown in FIG. 19(*a*) a hollow section 82; and after the reinforce member 9 is fitted in the core member 5, the hollow section is crashed as shown in FIG. 19(*a*) from above, to form the projection 81 as shown in FIG. 19(*b*); the projection 81 is inserted in the opening section 91 of the reinforce member 9, and the reinforce member 9 is fixed by the projection 81 inserted in the opening section 91.

In the core member 5 of the present embodying mode, since the projection 81 is formed by crashing the hollow section 82, it is favorable to dispose a notch in a sidewall 80 configuring the hollow section 82. As a result, the projection 81 can be easily formed by crashing the hollow section 82. Further, by using the notch section of the sidewall 80 as a start point, the hollow section 82 is bent to form the projection 81; hence, the contour of the projection 81 formed by crashing the hollow section 82 may be a particular contour, and the projection 81 can be easily inserted in the opening section 91 of the reinforce member 9. For example, when no notch is disposed in the sidewall 80, the location of the sidewall 80 at which the hollow section 82 is bent is not known; hence, it is difficult to determine the contour of the projection 81 and it is difficult to insert the projection 81 in the opening section 91 of the reinforce member 9. In contrast, when a notch is disposed in the sidewall 80, the hollow section 82 is bent by using the notch section as a start point; hence, it is easy to determine the contour of the projection 81 and it is easy to insert the projection 81 in the opening section 91 of the reinforce member 9. Hence, it is favorable to dispose a notch in the sidewall 80 configuring the hollow section 82.

In the layered panel 1 of the present embodying mode, as shown in FIG. 19(*b*), the core member 5 in which the reinforce member 9 is fixed by the projection 81 is placed as the core member 5 shown in FIG. 17; hence, it is possible to obtain the layered panel 1 in which both surfaces of the core member 5 are covered with the resin P2.

<Operation and Effects of Layered Panel 1 of Present Embodying Mode>

As above, for the layered panel 1 of the present embodying mode, the projection 81 is formed by crashing a part of the core member 5, to fix the reinforce member 9 by the projection 81. As a result, even when an arbitrary reinforce plate 9 is housed in the core member 5, it is possible as in the first embodying mode, to obtain the layered panel 1 in which the reinforce member 9 is not easily removed from the core member 5.

Incidentally, in the embodiment described above, the projection 81 shown in FIG. 19(*b*) is formed by crashing the hollow section 82 as shown in FIG. 19(*b*). However, as FIG. 20(*a*) shows, a projection 84 shown in FIG. 20(*b*) may be formed by crashing a solid section 83. Also in this situation, the projection 84 is inserted in the opening section 91 of the reinforce member 9, and the reinforce member 9 is fixed by the projection 84 inserted in the opening section 91. Incidentally, also in the case of the configuration shown in FIG. 20, it is favorable to dispose a notch in a sidewall 85 of the solid section 83. As a result, it is possible that by using the notch section of the sidewall 85 as a start point, the solid section 83 bends to easily form a projection 84. Further, since the solid section 83 bends by using the notch section of the sidewall 85 as a start point to form the projection 84, the contour of the projection 84 formed by crashing the solid section 83 may be a particular contour and the projection 84 can be easily inserted in the opening section 91 of the reinforce member 9. Incidentally, it is also possible that a plurality of through holes, rather than the notch, are disposed in the sidewall 85 to facilitate the crashing of the solid section 83. That is, only if it is possible to easily form the projection 84 by crashing the solid section 83, any process may be beforehand conducted for the solid section 8.

Figure 20:
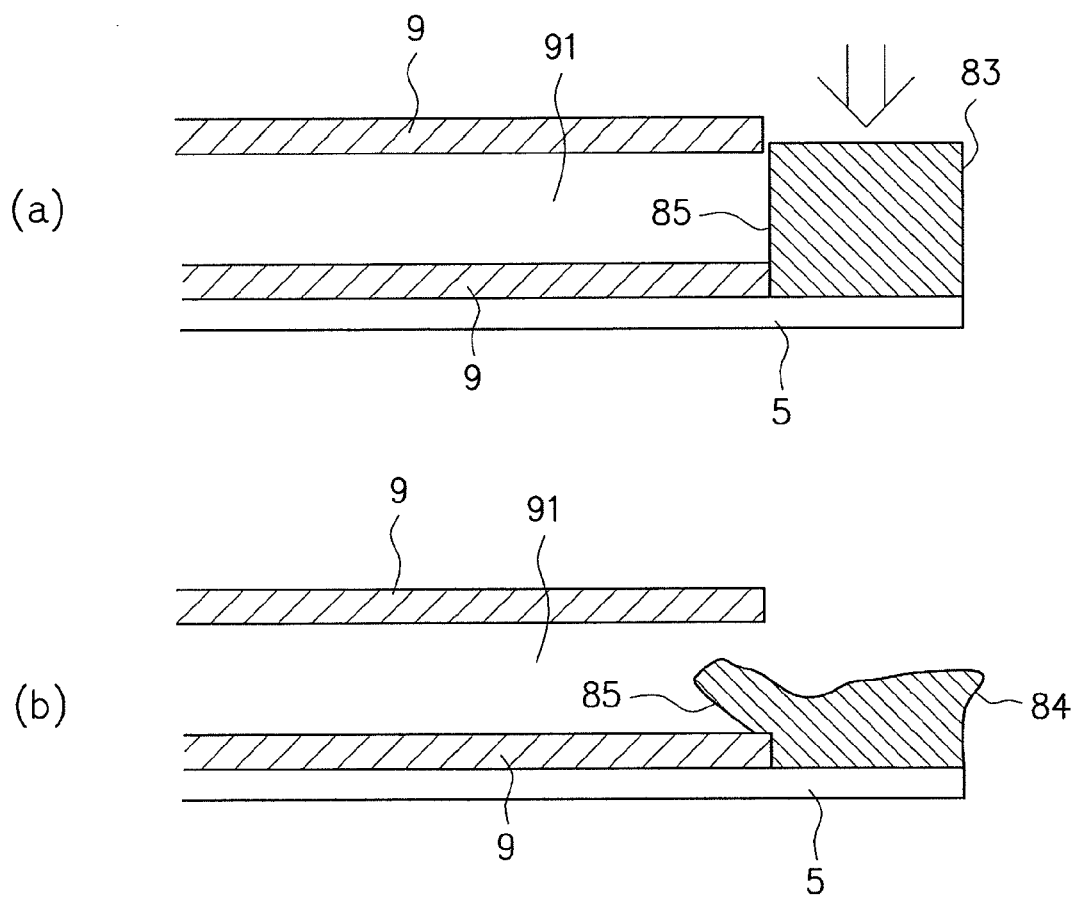
FIG. 20 is a second diagram showing a configuration example of the core member 5 in the fourth embodying mode.

However, to form the projection 84 by crashing the solid section 83 as shown in FIG. 20, more force is required than a situation wherein the projection 81 is formed by crashing the hollow section 82 as shown in FIG. 19. Hence, as FIG. 19 shows, it is favorable that the hollow section 82 is formed and then the projection 81 is formed by crashing the hollow section 82.

(Fifth Embodying Mode)

Next, description will be given of the fifth embodying mode.

Figure 21:
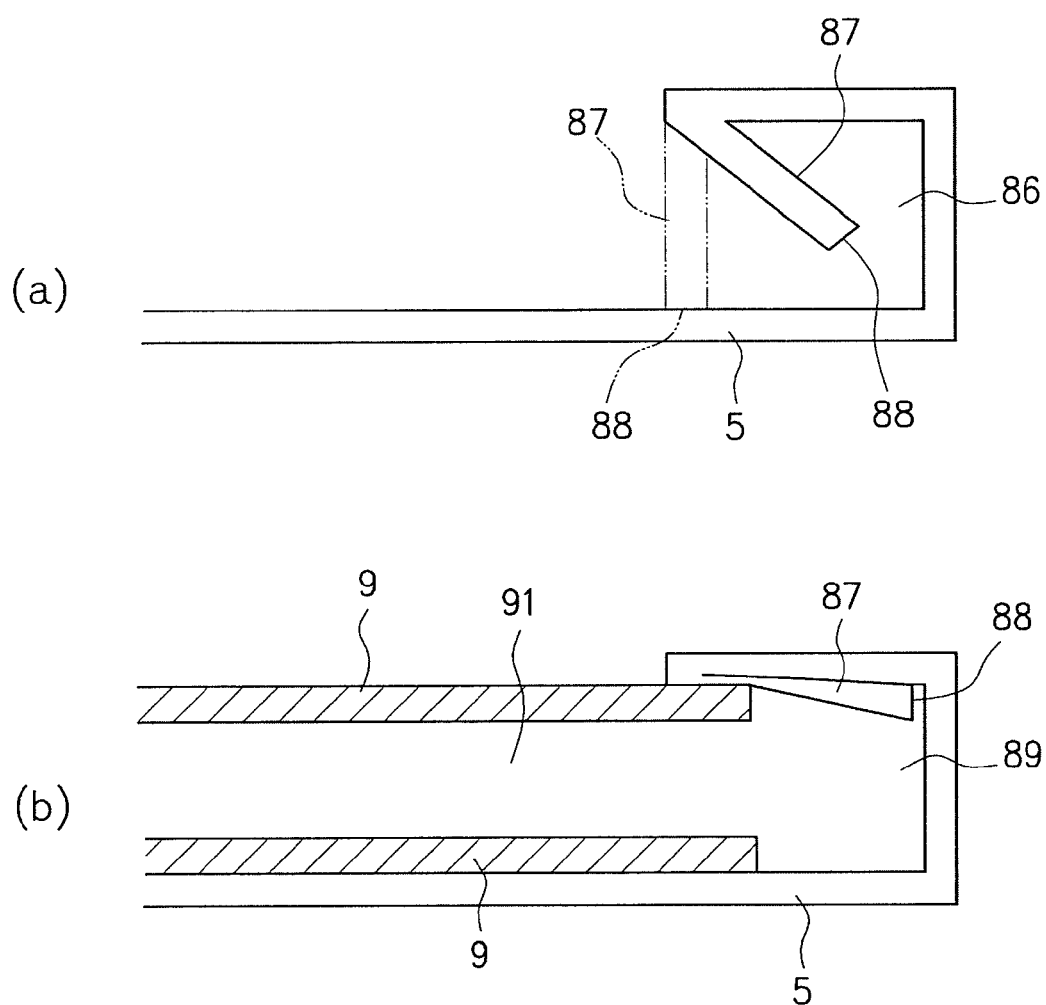
FIG. 21 is a diagram showing a configuration example of the core member 5 in a fifth embodying mode.

In the fifth embodying mode, an opening section 89 is formed as shown in FIG. 21(*b*) by forming an opening in portions (both ends of the housing section 10) of the core member 5, and end sections of the reinforce member 9 are inserted in the opening sections 89, to fix the reinforce member 9 by the opening sections 89. As a result, even when an arbitrary reinforce plate 9 is housed in the core member 5, it is possible as in the third embodying mode to provide the layered panel 1 in which the reinforce member 9 is not easily removed from the core member 5. Next, referring to FIG. 21, description will be given of the fifth embodying mode.

<Core Member 5 Configuration Example>

First, referring to FIG. 21, description will be given of a configuration example of the core member 5 of the present embodying mode.

In the core member 5 of the present embodying mode, the opening section 89 is formed as shown in FIG. 21(*b*) by forming an opening in portions (both ends of the housing section 10) of the core member 5, and end sections of the reinforce plate 9 are inserted in the opening sections 89, to fix the reinforce plate 9 by the opening sections 89. The portion to form the opening section 89 includes, as shown in FIG. 21(*a*), a hollow section 86, and a notch 88 is disposed at one end of a sidewall 87 configuring the hollow section 86, and by forming an opening using the sidewall 87, the opening section 89 can be formed. And, by inserting the end section of the reinforce member 9 in the opening section 89, the reinforce member 9 is fixed.

In layered panel 1 of the present embodying mode, by placing the core member 5 in which the reinforce member 9 is fixed by the opening section 89 as the core member 5 shown in FIG. 17, it is possible to obtain the layered panel 1 in which both surfaces of the core member 5 are covered with the resin P2.

Incidentally, in the configuration of FIG. 21, the notch 88 is disposed at one end of the sidewall 87, to keep the sidewall 87 remained in the opening section 89. As a result, when the end section of the reinforce member 9 is inserted in the opening sections 89, the sidewall 87 can fulfill a function in which the gap between the reinforce member 9 and the opening section 89 is filled with the sidewall 87 and a function as a buffer member. However, it is also possible that without keeping the sidewall 87 remained in the opening section 89, the notch 88 is disposed at both ends of the sidewall 87 and then the sidewall 87 is removed. In this situation, due to the absence of the sidewall 87, it is possible to easily insert the end section of the reinforce member 9 in the opening sections 89.

<Operation and Effects of Layered Panel 1 of Present Embodying Mode>

As above, for the layered panel 1 of the present embodying mode, an opening section 89 is formed by forming an opening in portions of the core member 5, and end sections of the reinforce member 9 are inserted in the opening sections 89, to fix the reinforce member 9 by the opening sections 89. As a result, even when an arbitrary reinforce plate 9 is housed in the core member 5, it is possible as in the third embodying mode to provide the layered panel 1 in which the reinforce plate 9 is not easily removed from the core member 5.

(Sixth Embodying Mode)

Next, description will be given of the sixth embodying mode.

Figure 22:
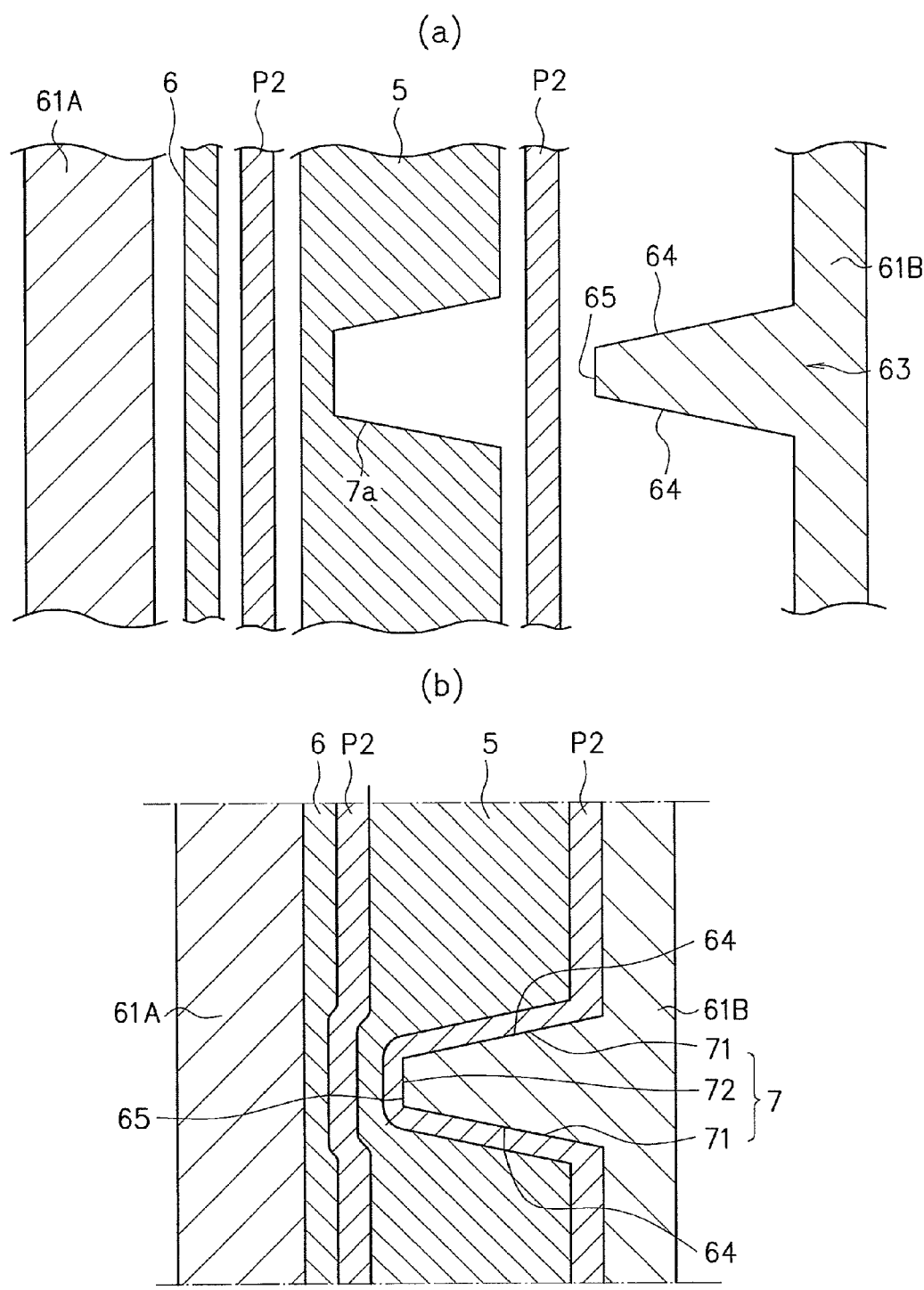
FIG. 22 is a diagram showing a molding method example of the layered panel 1 shown in FIG. 3.

As a method to mold the layered panel 1 including the hinge 7 including the hinge section 7*a* shown in FIG. 3, there exists, for example, the following method. First, there is beforehand molded a core member 5 in which the hinge section 7*a* is formed by compressing a part of the core member 5. And as shown in FIG. 22(*a*), the core member 5 including the hinge section 7*a* is placed between the blocks of resin P2 in a melted state to configure the front wall 2 and the rear wall 3 of the layered panel 1. And as shown in FIG. 22(*b*), the core member 5 and the resin P2 in a melted state to configure the front wall 2 and the rear wall 3 are clamped by the split molds 61, and the core member 5 and the resin P2 to configure the front wall 2 and the rear wall 3 are welded onto each other, to thereby mold the layered panel 1 including the hinge 7 including the hinge section 7*a*. As a result, it is possible to mold the layered panel 1 including the hinge 7 including the hinge section 7*a* shown in FIG. 3. FIG. 22(*a*) shows a state before the split molds 61 are clamped and FIG. 22(*b*) shows a state when the split molds 61 are clamped.

As FIG. 22(*b*) shows, when the core member 5 and the resin P2 in a melted state to configure the front wall 2 and the rear wall 3 are clamped by the split molds 61, the core member 5, the resin P2 to configure the front wall 2 and the rear wall 3, and the ornamental member 6 are compressed by the hinge forming section 63, to form the hinge 7 including the hinge section 7*a* shown in FIG. 3. The hinge forming section 63 is disposed to form the hinge 7. The hinge forming section 63 is configured by including a stand wall forming section 64 to form a stand wall 71 and a compression-molding section 65 to form a compressed section 10, and forms as shown in FIG. 3 the hinge 7 configured by including the stand wall 71 and a compressed section 72.

In a situation to form a thin hinge 7, when the core member 5 and the resin P2 in a melted state to configure the front wall 2 and the rear wall 3 are clamped by the split molds 61, it is required that the core member 5 and the resin P2 to configure the front wall 2 and the rear wall 3 are crashed by the compression-molding section 65, to extrude the resin P2 to configure the front wall 2 and the rear wall 3 into the periphery of the compression-molding section 65. However, as shown in FIG. 22(*b*), no escape area exists for the resin P2 to configure the front wall 2 side; hence, the resin P2 to configure the front wall 2 side rises as a lamp on the ornamental member 6 side and the core member 5 side, and there may occur unevenness in the resin P2 to configure the front wall 2 side and the contour of the core member 5 may be deformed to cause unevenness in the core member 5. This problem is more remarkable when thickness of the resin P2 configuring the front wall 2 side is larger or the area of the compression-molding section 65 is larger because the amount of the resin P2 which is to be extruded into the periphery of the compression-molding section 65 and which configures the front wall 2 side increases. Further, in FIG. 22, a situation in which a solid core member 5 is employed is shown as an example; however, in a situation in which a partly-hollow core member 5 is employed, unevenness easily takes place in the core member 5 due to the resin P2 which is extruded into the periphery of the compression-molding section 65 and which configures the front wall 2 side. Also, when the resin P2 to configure the front wall 2 side is compressed and is thinned down by the compression-molding section 65, it is required to extrude a large amount of resin P2 to configure the front wall 2 side into the periphery of the compression-molding section 65; however, since there does not exist the escape area for the resin P2 to configure the front wall 2 side, the resin P2 to configure the front wall 2 side cannot be reduced in thickness. When the resin P2 to configure the front wall 2 side cannot be reduced in thickness, the hinge 7 is increased in thickness in the layer direction (A shown in FIG. 9); hence, the layered panel 1 cannot easily rotate and the function of the hinge 7 cannot be efficiently fulfilled depending on cases.

Figure 23:
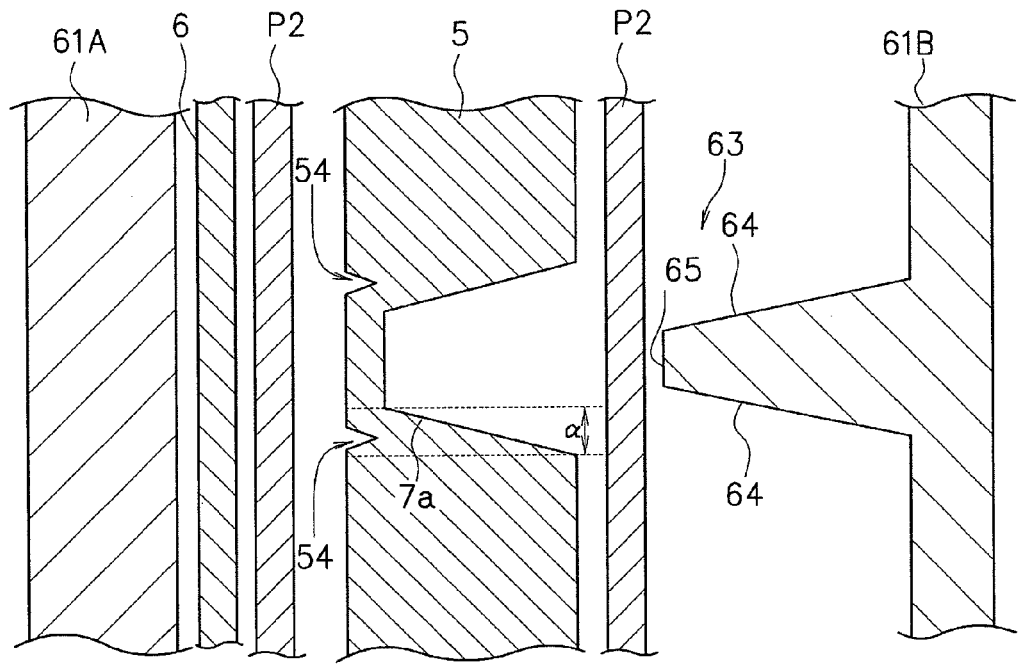
FIG. 23 is a diagram showing a molding method example of the layered panel 1 in a sixth embodying mode.
Figure 23:
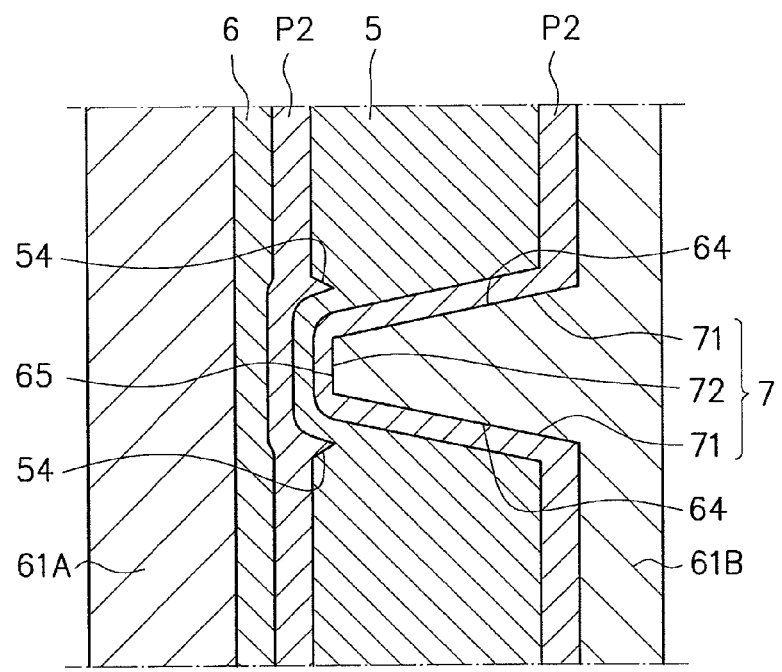
Figure 24:
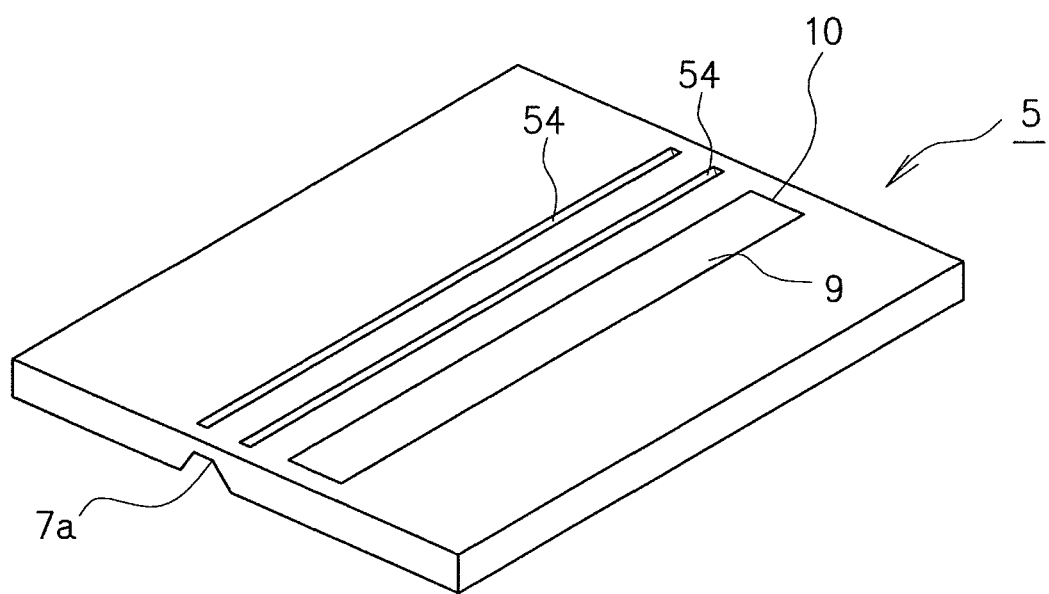
FIG. 24 is a diagram showing a configuration example of the core member 5 configuring the layered panel in the sixth embodying mode.

Hence, in the present embodying mode, to secure the escape area for the resin P2 to configure the front wall 2 side, grooves 54 are disposed in the core member 5 as shown in FIGS. 23 and 24. The grooves 54 are configured by depressing the surface of the core member 5 to be brought into contact with the front wall 2 side. Further, the grooves 54 are disposed on both sides of the hinge section 7a as shown in FIGS. 23 and 24. FIG. 23(a) shows a state before the split molds 61 are clamped and FIG. 23(b) shows a state when the split molds 61 are clamped. FIG. 24 is a diagram showing a configuration example of the core member 5 in which the grooves 54 are formed therein. Since the hinge section 7a is formed by depressing in a direction from the surface on the rear wall 3 side to that of the front wall 2 side of the core member 5, the grooves 54 are formed by depressing in a direction from the surface on the front wall 2 side to that of the rear wall 3 side of the core member 5. Further, the grooves 54 are formed, to store the resin P2 which is extruded into the periphery of the compression-molding section 65 and which configures the front wall 2 side, in areas on the front wall 2 side of the core member 5 not compressed by the compression-molding section 65 as shown in FIG. 23. In FIG. 23, the grooves 54 are formed in the range of area α in which stand walls 71 are formed by the stand wall forming section 64. Also, in FIG. 23, the grooves 54 are formed in a triangular contour. Incidentally, for the positions to form the grooves 54, only if they are in the vicinity of the hinge 7 capable of securing the escape area for the resin P2 which is extruded into the periphery of the compression-molding section 65 and which configures the front wall 2 side, the grooves 54 may be formed at any positions; it is possible to dispose the grooves 54, for example, not in the range of area α shown in FIG. 23, but in the range twice (2α) the area α relative to the position of the core member 5 to make contact with the compression-molding section 65. By disposing the grooves 54 in the range of 2α relative to the position of the core member 5 to make contact with the compression-molding section 65, it is possible to store the resin P2 extruded into the periphery of the compression-molding section 65. However, in consideration of the securing of the escape area for the resin P2 which is extruded into the periphery of the compression-molding section 65 and which configures the front wall 2 side, it is favorable that the grooves 54 are formed in the range of area α in which stand walls 71 are foamed by the stand wall forming section 64. As a result, the resin P2 which is extruded by the compression-molding section 65 and which configures the front wall 2 side can easily flow into the grooves 54. Further, for the contour of the grooves 54, only if it is possible to secure the escape area for the resin P2 to configure the front wall 2 side, the grooves 54 may be formed in any contour. However, it is favorable to form them in a contour in which the resin P2 which is extruded by the compression-molding section 65 and which configures the front wall 2 side can easily flow thereinto. For example, it is favorable to form them in a contour in which the forming areas of the grooves 54 are increased and are in a contour gradually inclined toward the compression-molding section 65. Further, as shown in FIG. 24, the grooves 54 are linearly and continuously formed along the forming position of the hinge section 7a; however, they may be partly formed along the forming position of the hinge section 7a. Also, in FIG. 24, the grooves 54 are formed on both sides of the hinge section 7a in parallel with the hinge section 7a; however, it is also possible to form the grooves 54 at least one of the sides of the hinge section 7a. However, in consideration of the storing of the resin P2 extruded by the compression-molding section 65, it is favorable as shown in FIG. 24 to form the grooves 54 on both sides of the hinge section 7a.

In the layered panel 1 of the present embodying mode, there is beforehand formed the core member 5 including the grooves 54 and the hinge section 7a as shown in FIG. 24. And as shown in FIG. 23(a), the core member 5 including the grooves 54 and the hinge section 7a is placed between the blocks of resin P2 in a melted state to configure the front wall 2 and the rear wall 3 of the layered panel 1. And as shown in FIG. 23(b), the core member 5 and the resin P2 in a melted state to configure the front wall 2 and the rear wall 3 are clamped by the split molds 61, and the core member 5 and the resin P2 to configure the front wall 2 and the rear wall 3 are welded onto each other, to thereby mold the layered panel 1 including the hinge 7 including the hinge section 7a. The hinge 7 includes stand walls 71 foamed by the stand wall forming section 64 and a compressed section 72 formed by the compression-molding section 65, and both ends of the compressed section 72 are linked with one end of each stand wall 71 such that two stand walls 71 are rotatable about the compressed section 72 as the rotary axis. Further, in the vicinity of the hinge 7 including the stand walls 71 and the compressed section 72, there are included the grooves 54, and the grooves 54 are buried by the resin P2 to configure the front wall 2 side. Hence, the front wall 2 configuring the hinge 7 and the core member 5 are reduced in thickness.

The core member 5 of the present embodying mode includes the grooves 54; hence, when molding the hinge 7 including the hinge section 7a by compressing the core member 5, the resin P2 to configure the front wall 2 and the rear wall 3, and the ornamental member 6 by the hinge forming section 63, the resin P2 in a melted state which is extruded into the periphery of the compression-molding section 65 and which configures the front wall 2 side can be stored in the grooves 54. Hence, it is possible to secure the escape area for the resin P2 which is extruded into the periphery of the compression-molding section 65 and which configures the front wall 2 side. The grooves 54 formed in the core member 5 are buried by the resin P2 which is extruded into the periphery of the compression-molding section 65 and which configures the front wall 2 side; hence, it is possible to reduce unevenness occurring in the resin P2 configuring the front wall 2 side and the core member 5. Further, since the resin P2 to configure the front wall 2 side can be easily extruded into the periphery of the compression-molding section 65, the resin P2 configuring the hinge 7 and the core member 5 can be reduced in thickness. Incidentally, for the present embodying mode, description has been given of a configuration example of the core member 5 in which the grooves 54 are disposed in the vicinity of the hinge 7 capable of securing the escape area for the resin P2 which is extruded into the periphery of the compression-molding section 65 and which configures the front wall 2 side. However, in the core member 5, it is also possible to dispose the grooves 54 in the vicinity of the hinge 7 capable of securing the escape area for the resin P2 which is extruded by the hinge forming section 63 and which configures the rear wall 3 side.

<Operation and Effects of Layered Panel 1 of Present Embodying Mode>

As above, in the layered panel 1 of the present embodying mode, in a situation wherein there are beforehand formed the grooves 54 by depressing the surface of the core member 5, and the core member 5 and the resin P2 in a melted state to configure the front wall 2 and the rear wall 3 of the layered panel 1 are clamped by the split molds 61 to thereby form the hinge 7 by the hinge forming section 63 disposed in the split molds 61, the resin P2 extruded by the hinge forming section 63 is stored in the grooves 54 disposed in the vicinity of the hinge 7, to bury the grooves 54 by the resin P2. Hence, the resin P2 extruded by the hinge forming section 63 can be stored in the grooves 54; hence, it is possible to reduce unevenness occurring in the periphery of the hinge 7. Further, the resin P2 to configure the hinge 7 can be reduced in thickness. As a result, it is possible to form the hinge 7 having desired strength.

(Seventh Embodying Mode)

Next, description will be given of the seventh embodying mode.

In the sixth embodying mode, it is possible by forming the grooves 54 in the core member 5 as shown in FIGS. 23 and 24 to reduce unevenness occurring in the periphery of the hinge 7 and to reduce the resin P2 to configure the hinge 7 and the core member 5 in thickness.

Figure 25:
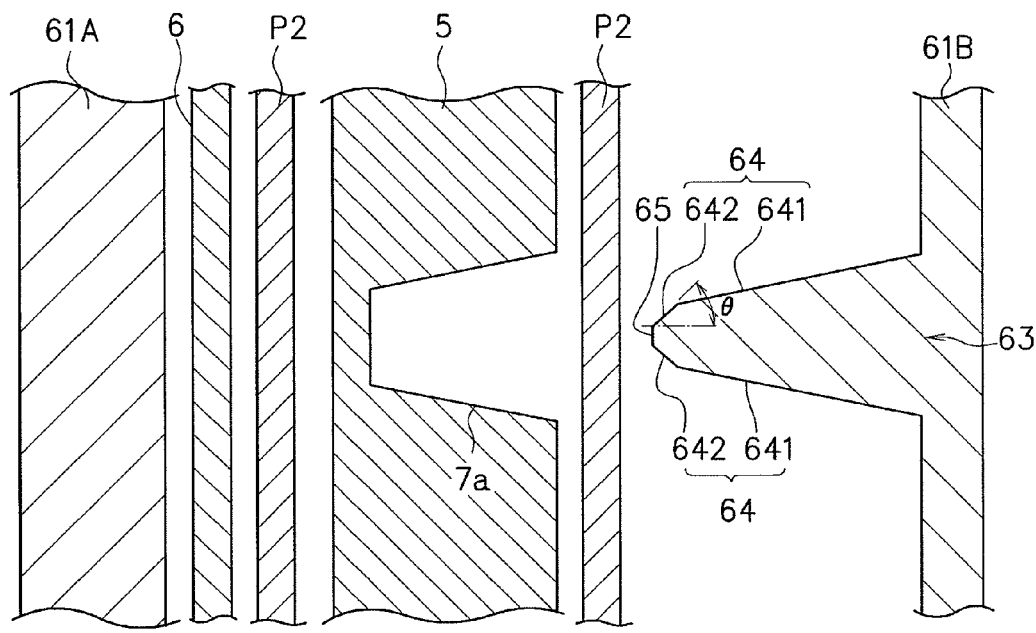
FIG. 25 is a diagram showing a molding method example of the layered panel 1 in a seventh embodying mode.
Figure 25:
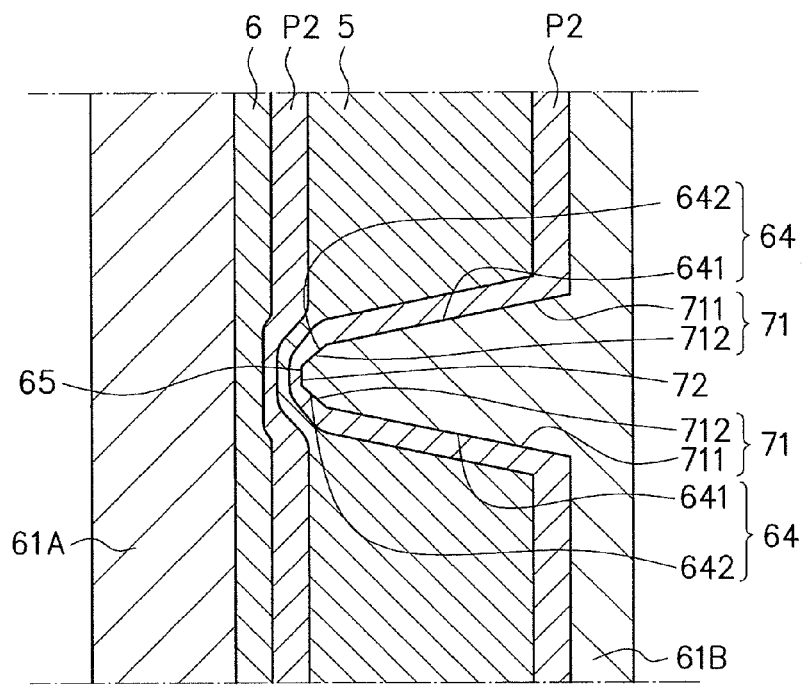

In the present embodying mode, as shown in FIG. 25, the contour of the hinge forming section 63 is changed such that the tip end of the hinge forming section 63 is sharp-pointed in the configuration. The tip end of the hinge forming section 63 means the end section, on the compression-molding section 65 side, of the section configured by the stand wall forming section 64 and the compression-molding section 65. For example, in a situation wherein the contour of the hinge forming section 63 is configured in a trapezoidal contour and the resin P2 is compressed by the hinge forming section 63 having the trapezoidal contour, the amount of the resin P2 to be extruded into the periphery of the compression-molding section 65 increases as the width of the compression-molding section 65 to configure the upper side of the trapezoidal contour is larger; hence, the resin P2 cannot be reduced in thickness. The width of the compression-molding section 65 means the area of the compression-molding section 65 interposed between the two stand wall forming sections 64. That is, as shown in FIG. 22, when the width of the tip end of the hinge forming section 63 increases, the amount of the resin P2 to be extruded into the periphery of the compression-molding section 65 increases; hence, the resin P2 cannot be reduced in thickness.

Figure 26:
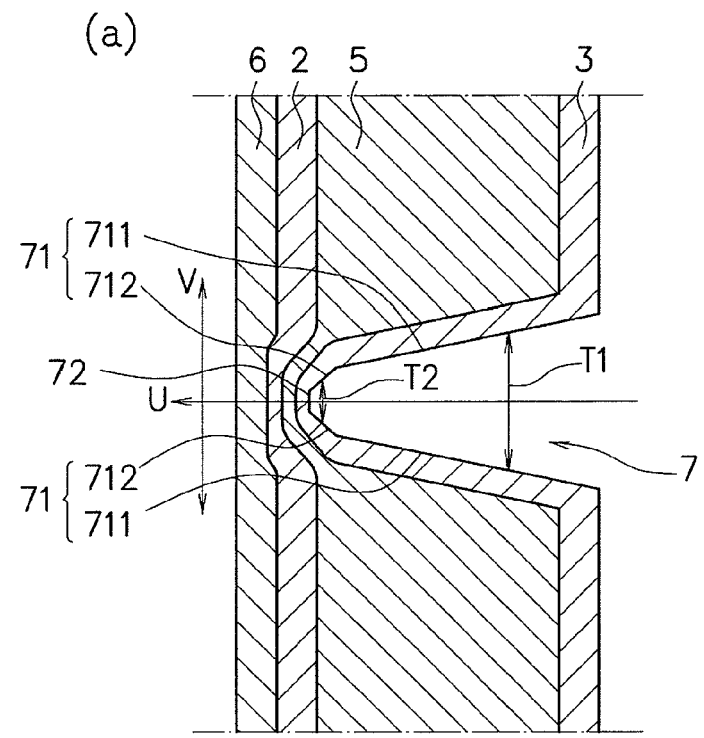
FIG. 26 is a diagram showing a configuration example of the hinge 7 of the layered panel 1 in the seventh embodying mode.
Figure 26:
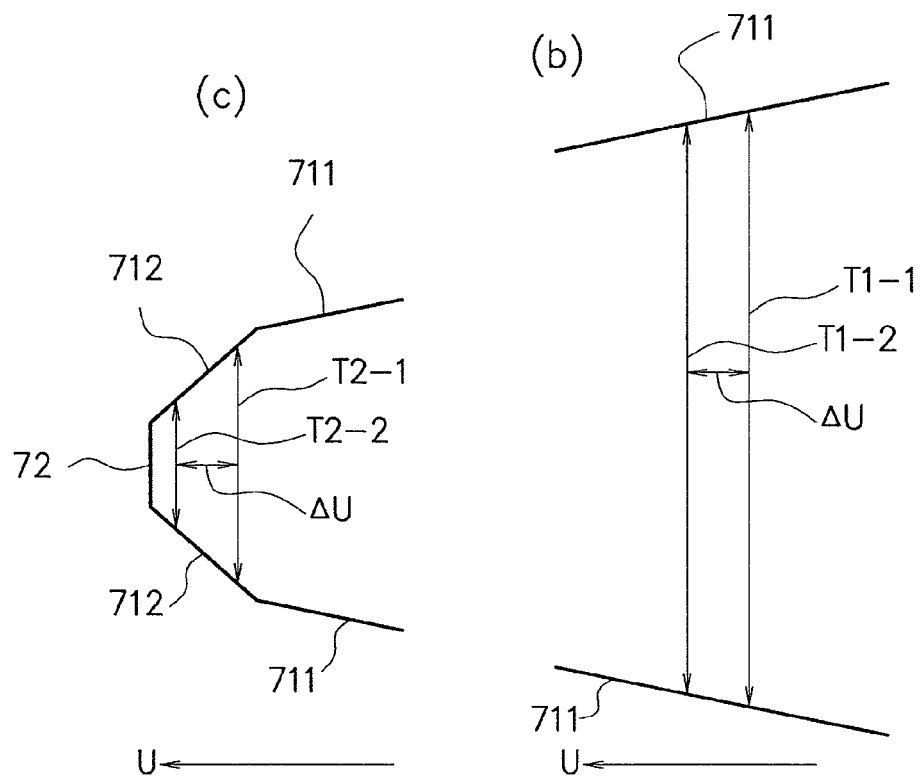

Hence, in the present embodying mode, as shown in FIG. 25, the tip end of the hinge forming section 63 is sharp-pointed in the configuration and the width of the tip end of the hinge forming section 63 is minimized. Specifically, the stand wall forming section 64 to configure the hinge forming section 63 is configured using a first stand wall forming section 641 and a second stand wall forming section 642, the link section between the first stand wall forming section 641 and the second stand wall forming section 642 is bent, and the width of the compression-molding section 65 connected to the second stand wall forming section 642 is minimized, to thereby sharp-point the tip end of the hinge forming section 63. This makes it possible to reduce the width of the tip end of the hinge forming section 63. The first stand wall forming section 641 is disposed to form a first stand wall 711 and the second stand wall forming section 642 is disposed to form a second stand wall 712. The compression-molding section 65 is disposed to form the compressed section 72. Hence, the hinge 7 of the present embodying mode is configured as shown in FIG. 26(a) by including the stand walls 71 and the compressed section 72; the stand wall 71 is configured by including the first stand wall 711 and the second stand wall 712; and the link section between the first stand wall 711 and the second stand wall 712 is bent in the configuration. Also, both ends of the compressed section 72 are linked with the second stand wall 712 and are configured such that the width of compressed section 72 is reduced.

FIG. 26(a) is a diagram showing a configuration example of the hinge 7 formed by the hinge forming section 63 shown in FIG. 25.

The compression-molding section 65 connected to the second stand wall forming section 642 shown in FIG. 25 is configured by a 1.0 mm wide flat plane, and angle θ formed between the second stand wall forming section 642 and the mold clamp direction of the split molds 61 is 45° in the configuration. Further, the angle formed between the compression-molding section 65 and the mold clamp direction of the split molds 61 is 90° in the configuration. Hence, it is possible that the width of the compression-molding section 65 is reduced and the tip end of the hinge forming section 63 is sharp-pointed. The width of the compression-molding section 65 means the area of the compression-molding section 65 interposed between two stand wall forming sections 642. When the hinge 7 shown in FIG. 26(a) is formed by use of the hinge forming section 63 shown in FIG. 25, the compressed section 72 of the hinge 7 is configured by the 1.0 mm wide flat plane and the angle formed between the compressed section 72 and the second stand wall 712 is 135° (45°+90°) in the configuration.

In the present embodying mode, since the width of the compression-molding section 65 is small, it is possible to reduce the amount of the resin P2 to be extruded into the periphery of the compression-molding section 65. Further, by minimizing the width of the compression-molding section 65, it is possible to increase the force to crash the resin P2 configuring the hinge 7 and the core member 5; hence, the resin P2 configuring the hinge 7 and the core member 5 can be reduced in thickness. When clamping the split molds 61, it is difficult to control the force to crash the resin P2 and the core member 5 by the compression-molding section 65; however, since the width of the compression-molding section 65 is small in the present embodying mode, it is possible that when clamping the split molds 61, the force to crash the resin P2 and the core member 5 is increased and the resin P2 and the core member 5 are reduced in thickness.

For the hinge forming section 63 of the present embodying mode, the width of the compression-molding section 65 is reduced such that the tip end of the hinge forming section 63 is sharp-pointed in the configuration. Hence, when forming the hinge 7 by the hinge forming section 63 in which the tip end is sharp-pointed, it is possible to sharp-point the bottom surface side (indicating the compressed section 72 side) in the depression contour of the hinge 7 depressed in a direction from the rear wall 3 to the front wall 2 side and to reduce the resin P2 configuring the hinge 7 and the core member 5 in thickness, to thereby form the hinge 7 having desired strength. The depression contour of the hinge 7 is configured as shown in FIG. 26(a) such that a first depression contour (indicating the depression contour configured by the first stand wall 711) and a second depression contour (indicating the depression contour configured by the second stand wall 712) are linked with each other in depression direction U directing from the opening side of the depression contour (indicating the opening side formed in the rear wall 3 of the hinge 7) to the bottom surface side (indicating the compressed section 72 side), and the second depression contour 712 is located on the bottom surface 72 side relative to the first depression contour 711.

Further, in the hinge 7 of the present embodying mode, when compared with first narrowing degree $\alpha_1$ at which width $T_1$ of the first depression contour 711 in orthogonal direction V orthogonally intersecting with depression direction U narrows toward the bottom surface 72 side, second narrowing degree $\beta_1$ at which width $T_2$ of the second depression contour 712 in orthogonal direction V narrows toward the bottom surface 72 side is larger (α1<β1). FIG. 26(a) shows a configuration example of the hinge 7, FIG. 26(b) is a diagram to explain first narrowing degree α1 of the first depression contour 711 of the hinge 7, and FIG. 26(c) is a diagram to explain second narrowing degree β1 of the second depression contour 712 of the hinge 7.

First narrowing degree α1 of the first depression contour 711 means as shown in FIG. 26(b) the narrowing change degree of the width between width T1-1 of the first depression contour 711 at an arbitrary position and width T1-2 of the first depression contour 711 at a position moved from the arbitrary position in depression direction U by a predetermined value (ΔU). First narrowing degree α1 of the first depression contour 711 can be derived from the expression below.

$$\alpha 1=(|(T1\text{-}1)-(T1\text{-}2)|)\div \Delta U$$

Second narrowing degree β1 of the second depression contour 712 means as shown in FIG. 26(c) the narrowing change degree of the width between width T2-1 of the second depression contour 712 at an arbitrary position and width T2-2 of the second depression contour 712 at a position moved from the arbitrary position in depression direction U by a predetermined value (ΔU). Second narrowing degree β1 of the second depression contour 712 can be derived from the expression below.

$$\beta 1=(|(T2\text{-}1)-(T2\text{-}2)|)\div \Delta U$$

In the hinge 7 of the present embodying mode, since second narrowing degree β1 of the second depression contour 712 is larger than first narrowing degree α1 of the first depression contour 711, it is possible to reduce the width of the compressed section 72 configuring the bottom surface of the depression contour of the hinge 7. Further, the link section between first depression contour 711 and the second depression contour 712 is bent in the configuration. As a result, the depression contour of the hinge 7 configured by the first depression contour 711 and the second depression contour 712 can be easily rotated via the compressed section 72.

In the hinge forming section 63 to form the hinge 7 of the present embodying mode, the width of the compression-molding section 65 is minimized; hence, it is possible to crash and to thin down the resin P2 configuring the hinge 7 and the core member 5 without applying strong force thereto. When the width of the compression-molding section 65 is large, the amount of the resin P2 to be extruded into the periphery of the compression-molding section 65 increases; hence, it is not possible to thin down the resin P2 configuring the hinge 7 and the core member 5 unless strong force is applied. In contrast, in the present embodying mode, the width of the compression-molding section 65 is small and the amount of the resin P2 to be extruded into the periphery of the compression-molding section 65 is small; hence, it is possible to thin down the resin P2 configuring the hinge 7 and the core member 5 without applying strong force. Further, since the width of the compression-molding section 65 is small, it is possible that the area of the compressed section 72 formed by the compression-molding section 65 becomes small and the compressed section 72 is reduced in thickness. As a result, the stand wall 71 configured by the first stand wall 711 and the second stand wall 712 can be easily rotated via the compressed section 72.

<Operation and Effects of Layered Panel 1 of Present Embodying Mode>

As above, the layered panel 1 of the present embodying mode is configured by sharp-pointing the tip end of the hinge forming section 63, and the core member 51 and the resin P2 in a melted state to configure the front wall 2 and the rear wall 3 of the layered panel 1 are clamped by the split molds 61 including the hinge forming section 63 including the sharp-pointed tip end, to mold the layered panel 1 in which the bottom surface side (indicating the compressed section 72 side) of the depression contour of the hinge 7 depressed in a direction from the rear wall 3 to the front wall 2 side is sharp-pointed. Hence, the resin P2 configuring the hinge 7 and the core member 5 can be reduced in thickness and unevenness occurring in the periphery of the hinge 7 can be reduced. As a result, it is possible to form the hinge 7 having desired strength.

Incidentally, the embodying modes described above are favorable embodying modes of the present invention, and the scope of the present invention is not limited only to these embodying modes, but various changes may be made therein without departing from the gist of the present invention.

For example, in the layered panel 1 of the embodying modes, the hinge 7 is configured in the depression contour depressed in a direction from the rear wall 3 to the front wall 2 side. However, it is also possible to configure the hinge 7 in the depression contour depressed in a direction from the front wall 2 to the rear wall 3 side. In this situation, the hinge section 7a to be formed in the core member 5 is also configured in the depression contour depressed in a direction from the front wall 2 to the rear wall 3 side. Further, the housing section 10 and the grooves 54 are configured in the contour depressed in a direction from the rear wall 3 to the front wall 2 side.

Further, the layered panel 1 of the embodying modes has been described by use of, as an example, a situation in which it is employed as a partition plate, a floor material, and the like of a trunk in a car or the like. However, the layered panel 1 of the embodying modes is not limited to members to be used in a car and the like, but may be employed as members for various uses.

DESCRIPTION OF REFERENCE NUMERALS

1 Layered panel
2 Front wall
3 Rear wall
4 Circumferential wall
5, 5a, 5b Core member (intermediate layer)
51 Click section
52 Notch
53 Opening section
54 Groove
6 Ornamental member
7 Hinge
71 Stand wall
711 First stand wall
712 Second stand wall
72 Compressed section
7a Hinge section
8 Opening section
9 Reinforce member
91 Opening section
10 Housing section
11 Non-woven fabric (intermediate layer)
12 Hollow section
P1, P2 Resin
40 Extruding head 41 Split mold
42 Hinge forming section
43 Housing forming section
44 Cavity
60 Extruding head
61 Split mold
62 Cavity
63 Hinge forming section
64 Stand wall forming section
641 First stand wall forming section
642 Second stand wall forming section
65 Compression-molding section
80 Sidewall
81 Projection
82 Hollow section
83 Solid section
84 Projection
85 Sidewall
86 Hollow section
87 Sidewall
88 Notch
89 Opening section

What is claimed is:

1. A layered panel comprising:
a front wall disposed at a front wall side of the layered panel;
a rear wall disposed at a rear wall side of the layered panel;
an intermediate layer interposed between the front wall and the rear wall;
an ornamental member that is adhered onto a surface of the front wall, disposed at the front wall side of the layered panel, such that the front wall is disposed between the ornamental member and the intermediate layer, and
a hinge defined by a depression contour provided in a portion of the layered panel that is interposed between the front wall and the rear wall, the portion of the layered panel being depressed in a depressing direction, the depressing direction being one of a direction from the front wall side to the rear wall side and a direction from the rear wall side to the front wall side, the depression contour dividing the layered panel into a first section disposed at a first side of the depression contour and a second section disposed at a second side of the depression contour that opposes the first side, the depression contour includes:
a flat bottom surface at an innermost part of the depression contour;
a first depression contour; and
a second depression contour that is linked with the first depression contour in the depressing direction at a first link section such that the first depression contour and the second depression contour together define the depression contour from an opening side of the depression contour to the flat bottom surface, the second depression contour being located between the flat bottom surface and the first depression contour, wherein
the first section and the second section of the layered panel are rotatable relative to each other about a rotary axis of the hinge,
when the first and second section of the layered panel are arranged along a horizontal plane that extends in an extending direction through both the first section and the second section:

a width of the first depression contour narrows continuously by a narrowing degree from a first end of the first depression contour located at the opening side of the depression contour to a second end of the first depression contour located at the first link section between the first depression contour and the second depression contour;
a width of the second depression contour narrows continuously by a narrowing degree from a first end of the second depression contour located at the first link section between the first depression contour and the second depression contour to a second end of the second depression contour located at the flat bottom surface;
the narrowing degree of the second depression contour is larger than the narrowing degree of the first depression contour; and
an outer side of the ornamental member is flat along the extending direction of the horizontal plane,
a thickness of the intermediate layer at the flat bottom surface is thinner than a thickness of the intermediate layer at the first and second sections,
a thickness of the rear wall at the flat bottom surface is thinner than a thickness of the rear wall at the first and second sections, and
the ornamental member and the front wall at the hinge are engaged and are each depressed in the depressing direction.

2. The layered panel in accordance with claim 1, wherein
the first link section between the first depression contour and the second depression contour is bent, and
a second link section between the second depression contour and the bottom surface is bent.

3. The layered panel in accordance with claim 1 wherein
the intermediate layer includes a first portion and a second portion,
the hinge is defined at least by the first portion of the intermediate layer,
the depression contour is provided in the first portion of the intermediate layer, the first portion of the intermediate layer is depressed in the direction from the rear wall side to the front wall side, and
the intermediate layer includes at least one groove defined in the second portion of the intermediate layer that is depressed in the direction from the front wall side to the rear wall side, and the at least one groove is buried by a resin that defines a portion of the front wall.

4. The layered panel in accordance with claim 3, wherein the groove is provided adjacent to a standing wall of the depression contour that connects a starting point of the depression contour and an outer edge of the bottom surface.

5. The layered panel in accordance with claim 3, wherein the first portion of the intermediate layer that defines the hinge is interposed between the front wall and the rear wall.

6. The layered panel in accordance with claim 1 wherein
the hinge is defined at least by a first portion of the intermediate layer,
a holding section is defined in at least a second portion of the intermediate layer, and the holding section is a deformed portion of the second portion of the intermediate layer that holds a reinforcement member.

7. The layered panel in accordance with claim 6, wherein
the holding section is a click section disposed at a notch in the second portion of the intermediate layer, and
the reinforcement member is held by the click section.

8. The layered panel in accordance with claim 7, wherein the first portion of the intermediate layer that defines the hinge is interposed between the front wall and the rear wall.

9. The layered panel in accordance with claim 6, wherein the reinforcement member is sandwiched between the holding section of the intermediate layer and one of the front wall and the rear wall.

10. The layered panel in accordance with claim 3, wherein
the at least one groove of the intermediate layer includes
two grooves, defined across the depression contour in the second portion of the intermediate layer, that are depressed in the direction from the front wall side to the rear wall side, and
the grooves are buried by a resin the defines a portion of the front wall.

11. The layered panel in accordance with claim 1, wherein the intermediate layer includes a foaming material, and a portion of the foaming material provided at the flat bottom surface has an expansion ratio of 2.0 or less.

12. The layered panel in accordance with claim 11, wherein another portion of the foaming material of the intermediate layer provided at the first and second sections has an expansion ratio of 2.5 to 5.0.

* * * * *